United States Patent
Katou

(10) Patent No.: US 11,463,302 B2
(45) Date of Patent: Oct. 4, 2022

(54) INFORMATION COMMUNICATING DEVICE, INFORMATION COMMUNICATING METHOD, INFORMATION COMMUNICATING SYSTEM, AND STORAGE MEDIUM

(71) Applicant: NEC Corporation, Tokyo (JP)

(72) Inventor: Haruki Katou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 142 days.

(21) Appl. No.: 16/644,555

(22) PCT Filed: Sep. 13, 2018

(86) PCT No.: PCT/JP2018/033929
§ 371 (c)(1),
(2) Date: Mar. 5, 2020

(87) PCT Pub. No.: WO2019/054435
PCT Pub. Date: Mar. 21, 2019

(65) Prior Publication Data
US 2020/0267050 A1     Aug. 20, 2020

(30) Foreign Application Priority Data
Sep. 14, 2017 (JP) .............................. JP2017-176810

(51) Int. Cl.
*H04L 41/0668* (2022.01)
*H04L 43/08* (2022.01)
*H04L 67/12* (2022.01)
*H04L 43/0823* (2022.01)
(Continued)

(52) U.S. Cl.
CPC .......... *H04L 41/0668* (2013.01); *H04L 12/66* (2013.01); *H04L 43/08* (2013.01);
(Continued)

(58) Field of Classification Search
CPC ......... H04L 67/28; H04L 12/66; H04L 67/12; H04L 41/0668; H04L 67/1034; H04L 43/08; H04L 43/0823; G16Y 10/75
See application file for complete search history.

(56) References Cited

U.S. PATENT DOCUMENTS

2001/0034853 A1    10/2001   Takatama et al.
2007/0165625 A1*    7/2007   Eisner .................. G06Q 20/223
                                                        370/389
(Continued)

FOREIGN PATENT DOCUMENTS

JP    2001-298482 A    10/2001
JP    5544006 B2        7/2014
(Continued)

OTHER PUBLICATIONS

International Search Report for PCT Application No. PCT/JP2018/033929, dated Nov. 13, 2018.
(Continued)

*Primary Examiner* — Lesa M Kennedy

(57) ABSTRACT

Provided is an information communication device which allows an appropriate transfer of communication data even in case of failure. This device includes: a communication unit which receives data transmitted from a device via a communication network; and a control unit which causes the communication unit to transmit data containing the data received to a first information processing device. If transmission of the data to the first information processing device fails, the information communication device identifies a second information processing device to which the data transmission process is assigned, based on information relating to the arrangement of each of one or more second information processing devices which information is relating to the second information processing devices, and information representing a priority level determined according to (Continued)

statistical information relating to the communication in each of the second information processing devices, and transfers the transmission data to the identified second information processing device.

16 Claims, 18 Drawing Sheets

(51) Int. Cl.
    *G16Y 10/75*     (2020.01)
    *H04L 12/66*     (2006.01)
    *H04L 67/1034*     (2022.01)

(52) U.S. Cl.
    CPC ...... *H04L 43/0823* (2013.01); *H04L 67/1034* (2013.01); *H04L 67/12* (2013.01); *G16Y 10/75* (2020.01)

(56) References Cited

U.S. PATENT DOCUMENTS

| | | | | |
|---|---|---|---|---|
| 2008/0046995 A1* | 2/2008 | Satterlee | ............ | H04L 12/4679 726/15 |
| 2011/0060822 A1* | 3/2011 | Fan | ............ | H04L 43/0811 709/224 |
| 2012/0314608 A1 | 12/2012 | Okuno et al. | | |
| 2014/0029411 A1* | 1/2014 | Nayak | ............ | H04L 41/0668 370/219 |
| 2014/0376377 A1 | 12/2014 | Mikoda et al. | | |
| 2017/0063605 A1 | 3/2017 | Cheng et al. | | |
| 2017/0251428 A1* | 8/2017 | Jimenez | ............ | H04W 48/20 |
| 2017/0295514 A1 | 10/2017 | Uchida et al. | | |
| 2018/0234266 A1* | 8/2018 | Rudolph | ............ | H04L 65/102 |
| 2018/0343083 A1* | 11/2018 | Teboulle | ............ | H04W 16/10 |
| 2019/0075043 A1* | 3/2019 | Selvaraj | ............ | H04L 45/02 |

FOREIGN PATENT DOCUMENTS

| | | |
|---|---|---|
| JP | 2017-079465 A | 4/2017 |
| WO | 2013/094013 A1 | 6/2013 |
| WO | 2016/056156 A1 | 4/2016 |

OTHER PUBLICATIONS

English translation of Written opinion for PCT Application No. PCT/JP2018/033929.

\* cited by examiner

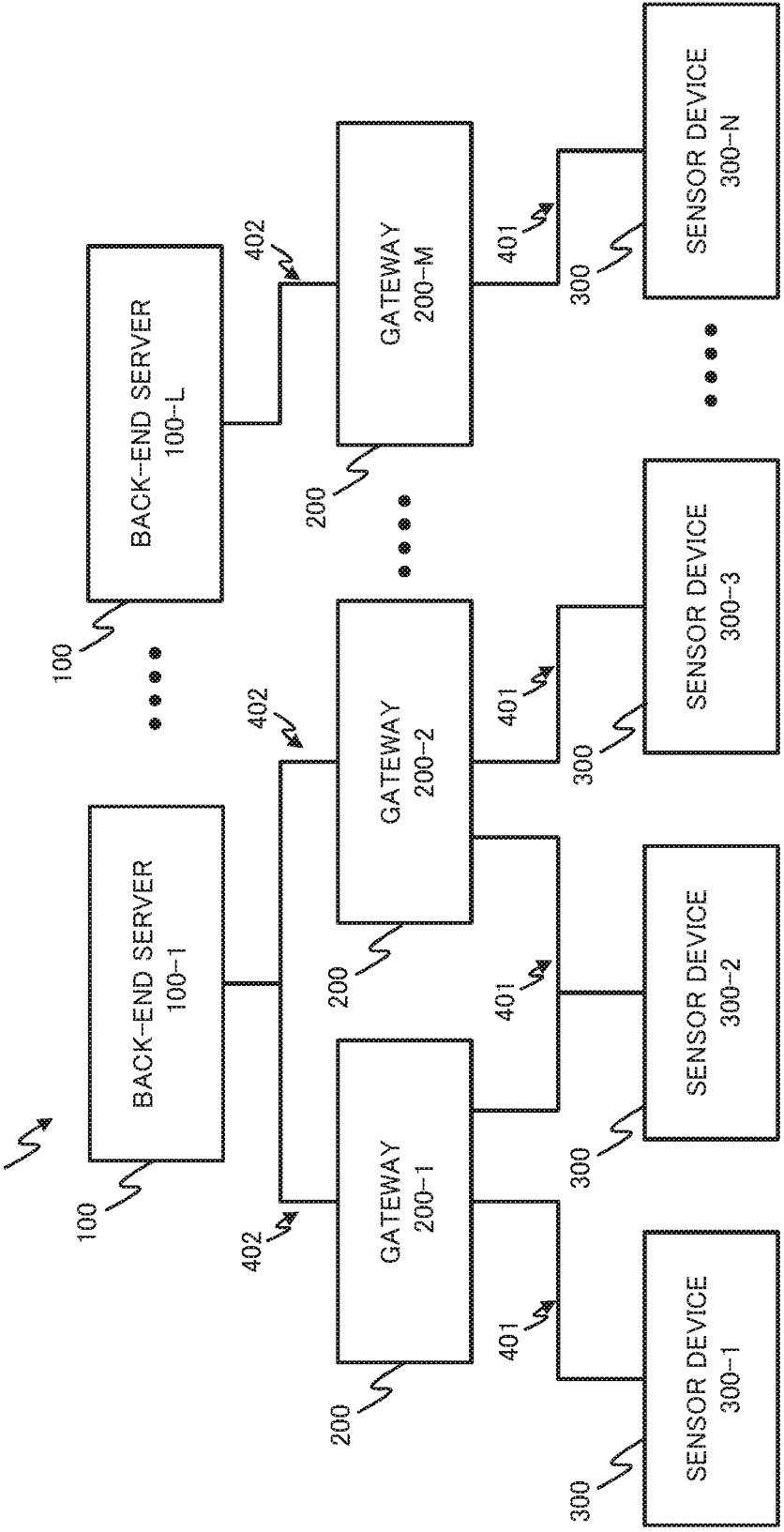

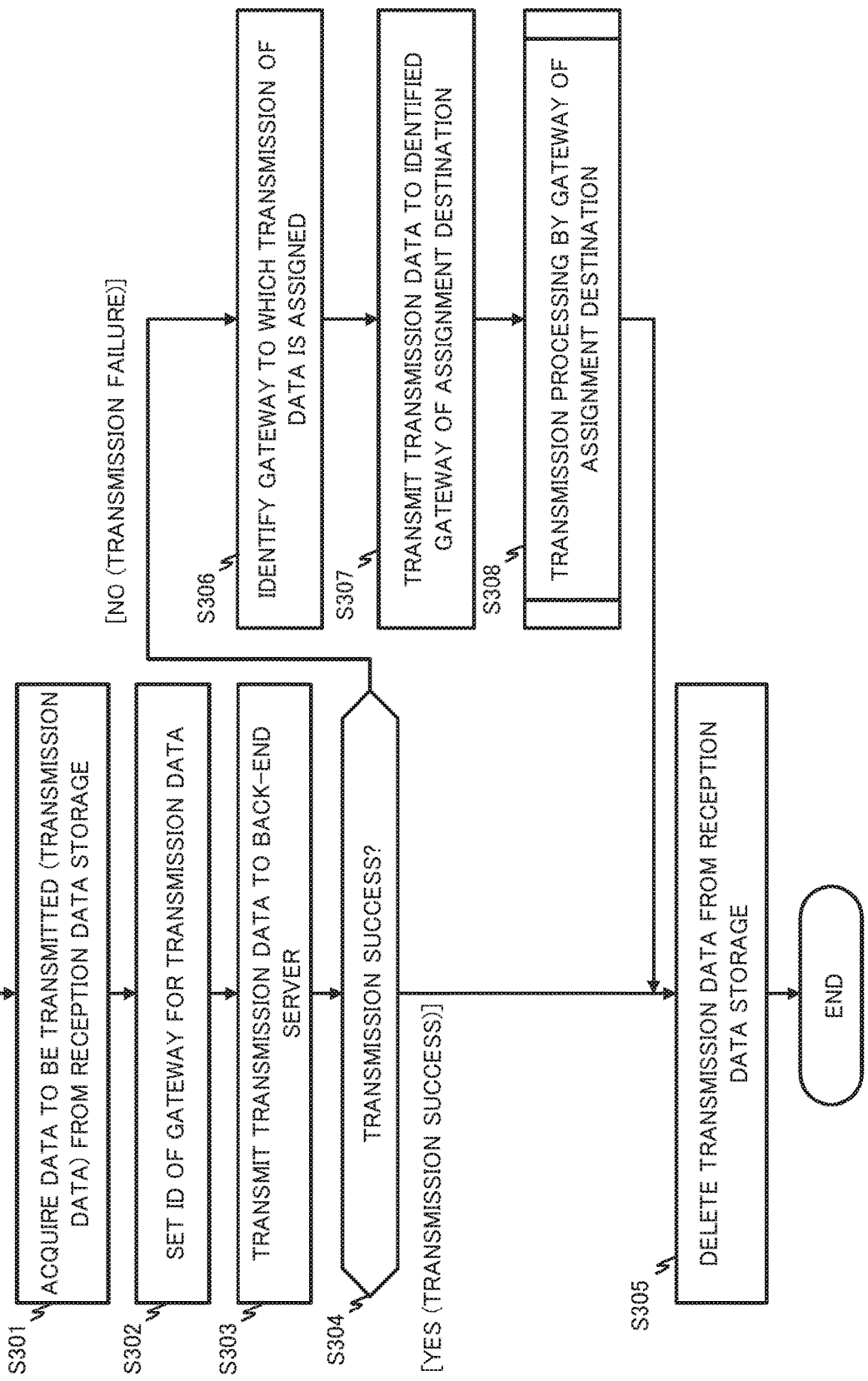

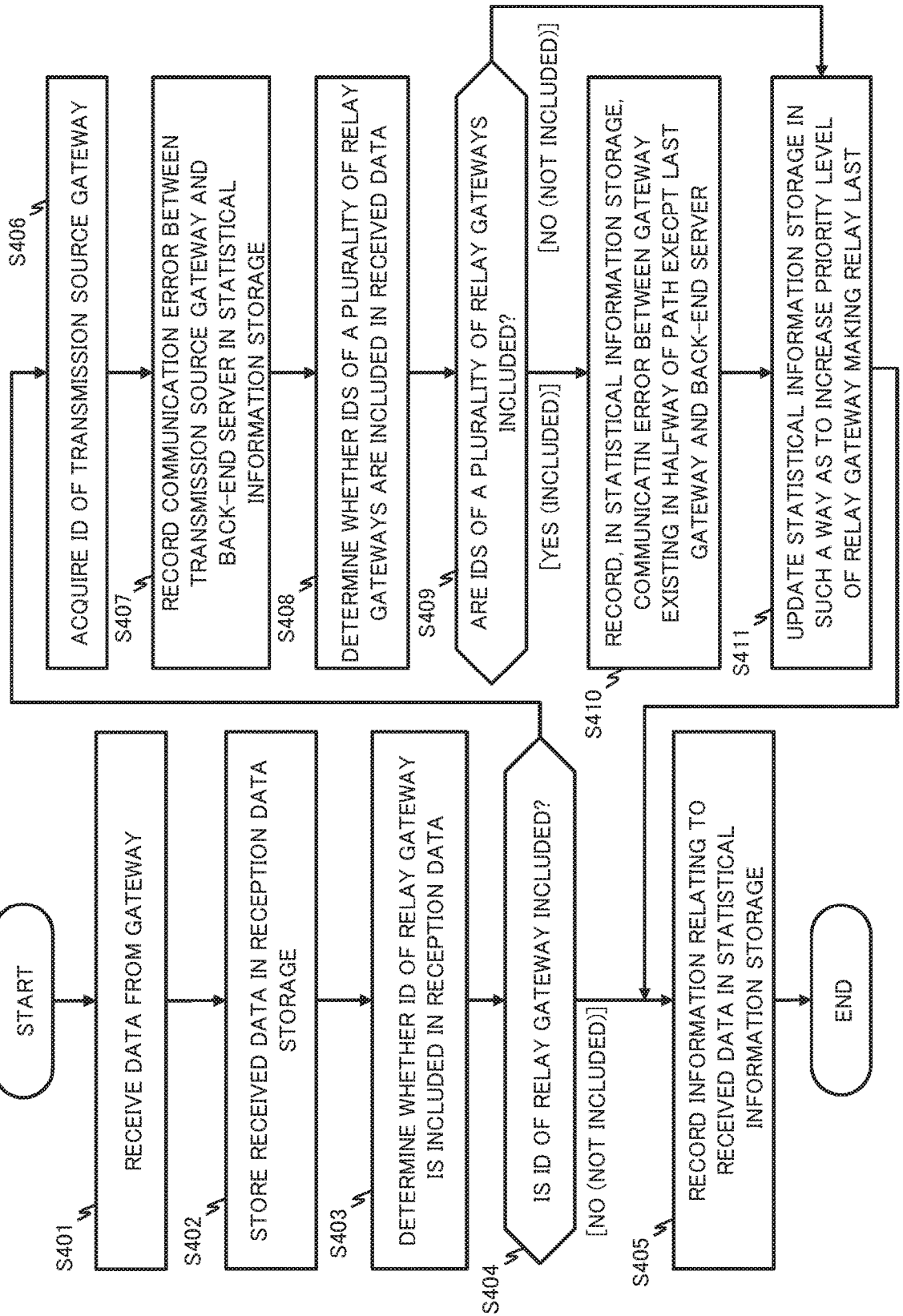

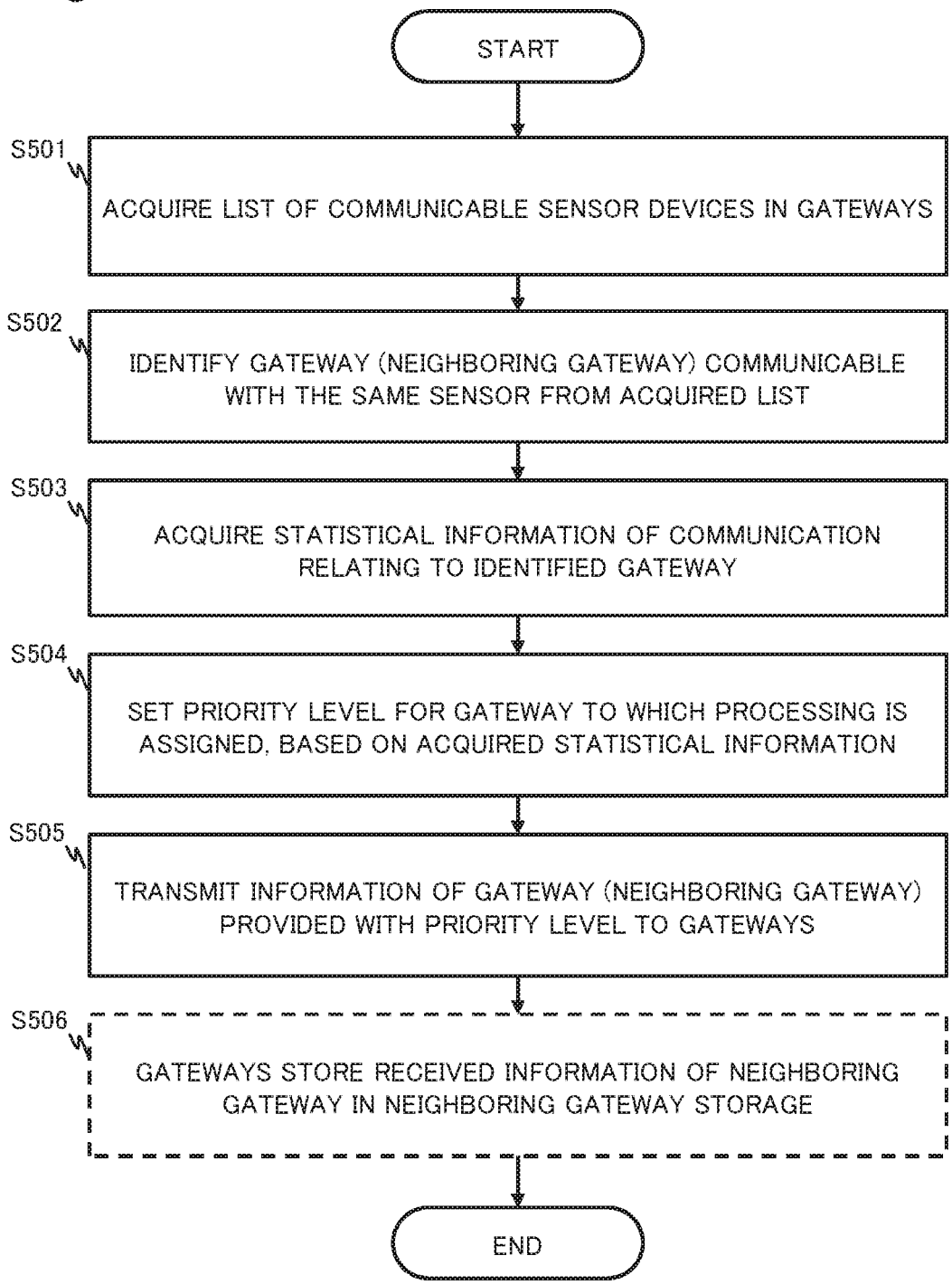

Fig. 6

```
"datetime": "2017-05-31T12:05:00.000Z",
"sensor-id": "temp-sensor1",
"temperature": "20"
```

Fig. 7

```
{
"gateway-id" : "gateway1",
"datetime" : "2017-05-31T12:30:00.000Z",
[
  {
    "datetime" : "2017-05-31T12:05:00.000Z",
    "sensor-id" : "temp-sensor1",
    "temperature" : "20"
  },
  {
    "datetime" : "2017-05-31T12:06:00.000Z",
    "sensor-id" : "temp-sensor2",
    "temperature" : "20"
  }
]
}
```

Fig. 8A

```
{
"gateway-id" : "gateway1",
"relay-gateway" : ["gateway2"],
"datetime" : "2017-05-31T12:30:00.000Z",
[
  {
    "datetime" : "2017-05-31T12:05:00.000Z",
    "sensor-id" : "temp-sensor1",
    "temperature" : "20"
  },
  {
    "datetime" : "2017-05-31T12:06:00.000Z",
    "sensor-id" : "temp-sensor2",
    "temperature" : "20"
  }
]
}
```

Fig. 8B

```
{
  "gateway-id" : "gateway1"
  "relay-gateway" : ["gateway2","gateway3"],
  "datetime": "2017-05-31T12:30:00.000Z",
  {
    "datetime" : "2017-05-31T12:05:00.000Z",
    "sensor-id" : "temp-sensor1",
    "temperature" : "20"
  },
  {
    "datetime" : "2017-05-31T12:06:00.000Z",
    "sensor-id" : "temp-sensor2",
    "temperature" : "20"
  }
}
```

Fig. 9A

| GATEWAY ID 901 | LAST DATA RECEPTION TIME 902 | AVERAGE DATA SIZE 903 | ERROR OCCURRENCE NUMBER (LAST ONE HOUR) 904 | RELAY PRIORITY LEVEL 905 |
|---|---|---|---|---|
| gateway1 | 2017-05-31T12:00:00.000Z | 300 | 1 | LOW |
| gateway2 | 2017-05-31T12:30:00.000Z | 350 | 0 | HIGH |
| ... | ... | ... | ... | ... |

Fig. 9B

| GATEWAY ID 901 | LAST DATA RECEPTION TIME 902 | COMMUNICATION FREQUENCY (LAST ONE HOUR) 906 | AVERAGE DATA SIZE 903 | ERROR OCCURRENCE NUMBER (LAST ONE HOUR) 904 | RELAY PRIORITY LEVEL 905 |
|---|---|---|---|---|---|
| gateway1 | 2017-05-31 T12:00:00.000Z | 10 | 300 | 1 | LOW |
| gateway2 | 2017-05-31 T12:30:00.000Z | 5 | 350 | 0 | HIGH |
| ... | ... | ... | ... | ... | ... |

Fig. 10

| GATEWAY ID | PRIORITY LEVEL |
|---|---|
| gateway1 | 5 |
| gateway2 | 10 |
| ... | ... |

INFORMATION COMMUNICATING DEVICE, INFORMATION COMMUNICATING METHOD, INFORMATION COMMUNICATING SYSTEM, AND STORAGE MEDIUM

This application is a National Stage Entry of PCT/JP2018/033929 filed on Sep. 13, 2018, which claims priority from Japanese Patent Application 2017-176810 filed on Sep. 14, 2017, the contents of all of which are incorporated herein by reference, in their entirety.

TECHNICAL FIELD

The present invention relates to a technique in which a plurality of information communicating devices transfer data via a communication network.

BACKGROUND ART

A system using Internet of Things (IoT) in which various devices (e.g. sensors and the like) are communicably connected via a network is widely used in a social infrastructure system and the like. Therewith, a demand for a technique for transmitting data acquired by a device to a server (back-end server) that executes processing on data without occurrence of data loss (missing), a communication delay, and the like is increasing.

A technique relating to a system that executes processing on data collected by a plurality of devices is described, for example, in the following patent literatures. PTL 1 describes a technique in which, in a system including an entrance node that collects data from a plurality of sensors and an intelligence node that executes processing on the collected data, a transfer path of the collected data is controlled and thereby a server that executes processing on data is reset. PTL 2 describes a technique in which a plurality of gateway devices connected with IoT devices mutually confirm an operation state and, when any one of the gateway devices fails, the gateway device having failed is replaced with another gateway device.

CITATION LIST

Patent Literature

[PTL 1] Japanese Registered Patent Publication No. 5544006
[PTL 2] Japanese Unexamined Patent Application Publication No. 2017-79465

SUMMARY OF INVENTION

Technical Problem

In an IoT system, a failure may occur in a gateway device that aggregates devices and a communication network. When, due to the failure, communication between a gateway device and a back-end server that executes processing on data fails, there is a problem that data from a device under management of the gateway device having failed are not transmitted to the back-end server.

In contrast, when, for example, in the system described in PTL 1, a failure occurs in a communication network between an entrance node and an intelligence node, communication therebetween may not always be ensured. Further, in the system described in PTL 2, processing (loads) may be concentrated in a gateway device with which a gateway device having failed is replaced. This may cause a possibility that data loss and a communication delay may occur. The present disclosure has been made in view of such a circumstance.

Specifically, one object of the present disclosure is to provide an information communicating device and the like capable of appropriately transmitting communication data even a failure occurs.

Solution to Problem

To achieve the object described the above, an information communicating device according to an aspect of the present disclosure is configured described below. The information communicating device according to an aspect of the present disclosure includes: a communication unit that receives data transmitted from a device via a communication network; and a control unit that generates transmission data including data received by the communication unit and controls the communication unit in such a way as to transmit the transmission data to a first information processing device being an information processing device, wherein when transmission of the transmission data to the first information processing device fails, the control unit identifies a second information processing device to which processing of transmitting the transmission data is assigned, based on information relating to disposition of each of one or more second information processing devices that are other information processing devices capable of transmitting the transmission data to the first information processing device, the information being information relating to the second information processing devices, and information representing a priority level determined according to statistical information relating to communication in each of the second information processing devices, and controls the communication unit in such a way as to transfer the transmission data to the identified second information processing device.

An information communicating method according to an aspect of the present disclosure includes: by an information communicating device, receiving data transmitted from a device via a communication network; and generating transmission data including the received data and controlling to transmit the transmission data to a first information processing device being an information processing device, wherein in the controlling, when transmission of the transmission data to the first information processing device fails, identifying the second information processing device to which processing of transmitting the transmission data is assigned, based on information relating to disposition of each of one or more second information processing devices that are other information processing devices capable of transmitting the transmission data to the first information processing device, the information being information relating to the second information processing devices, and information representing a priority level determined according to statistical information relating to communication in each of the second information processing devices, and transferring the transmission data to the identified second information processing device.

The object can be achieved by an information communication device having the above configuration, a computer program (image analysis program) for realizing a communication processing method and the like by a computer, and a computer readable recording medium storing the computer program.

A computer program according to an embodiment of the present disclosure causes a computer configuring an information communication device to execute:

processing of receiving data transmitted from a device via a communication network;

processing of generating transmission data including the received data and transmitting the transmission data to a first information processing device being an information processing device; and processing of identifying, when transmission of the transmission data to the first information processing device fails, the second information processing device to which processing of transmitting the transmission data is assigned, based on information relating to disposition of each of one or more second information processing devices that are other information processing devices capable of transmitting the transmission data to the first information processing device, the information being information relating to the second information processing devices, and information representing a priority level determined according to statistical information relating to communication in each of the second information processing devices, and transferring the transmission data to the identified second information processing device.

The recording medium according to an aspect of the present disclosure may record the computer program described above.

Advantageous Effects of Invention

According to the present disclosure, even a failure occurs, communication data can be appropriately transferred.

BRIEF DESCRIPTION OF DRAWINGS

FIG. 1A is an illustrative diagram exemplarily illustrating a configuration of an information communicating system including an information communicating device (gateway) according to a first example embodiment of the present disclosure.

FIG. 3A is a flowchart (1) illustrating one example of an operation of transmitting data from a gateway to a back-end server according to the first example embodiment of the present disclosure.

FIG. 4 is a flowchart illustrating one example of an operation when a back-end server receives data from a gateway according to the first example embodiment of the present disclosure.

FIG. 5 is a flowchart illustrating one example of an operation in which a back-end server sets an assigned gateway used for assignment of processing according to the first example embodiment of the present disclosure.

FIG. 6 is an illustrative diagram illustrating a specific example of data transmitted from a sensor device according to the first example embodiment of the present disclosure.

FIG. 7 is an illustrative diagram illustrating a specific example of data transmitted from a gateway to a back-end server according to the first example embodiment of the present disclosure.

FIG. 8A is an illustrative diagram illustrating a specific example of data transmitted from a gateway (gateway that relays transmission of data) assigned with processing to a back-end server according to the first example embodiment of the present disclosure.

FIG. 8B is an illustrative diagram illustrating another specific example of data transmitted from a gateway (gateway that relays transmission of data) assigned with processing to a back-end server according to the first example embodiment of the present disclosure.

FIG. 9A is an illustrative diagram exemplarily illustrating a specific example of a statistical information storage table managed by a back-end server according to the first example embodiment of the present disclosure.

FIG. 9B is an illustrative diagram exemplarily illustrating another specific example of a statistical information storage table managed by a back-end server according to the first example embodiment of the present disclosure.

FIG. 10 is an illustrative diagram illustrating a specific example of a list of gateways in which a propriety level is set.

DESCRIPTION OF EMBODIMENTS

Figure 1B:
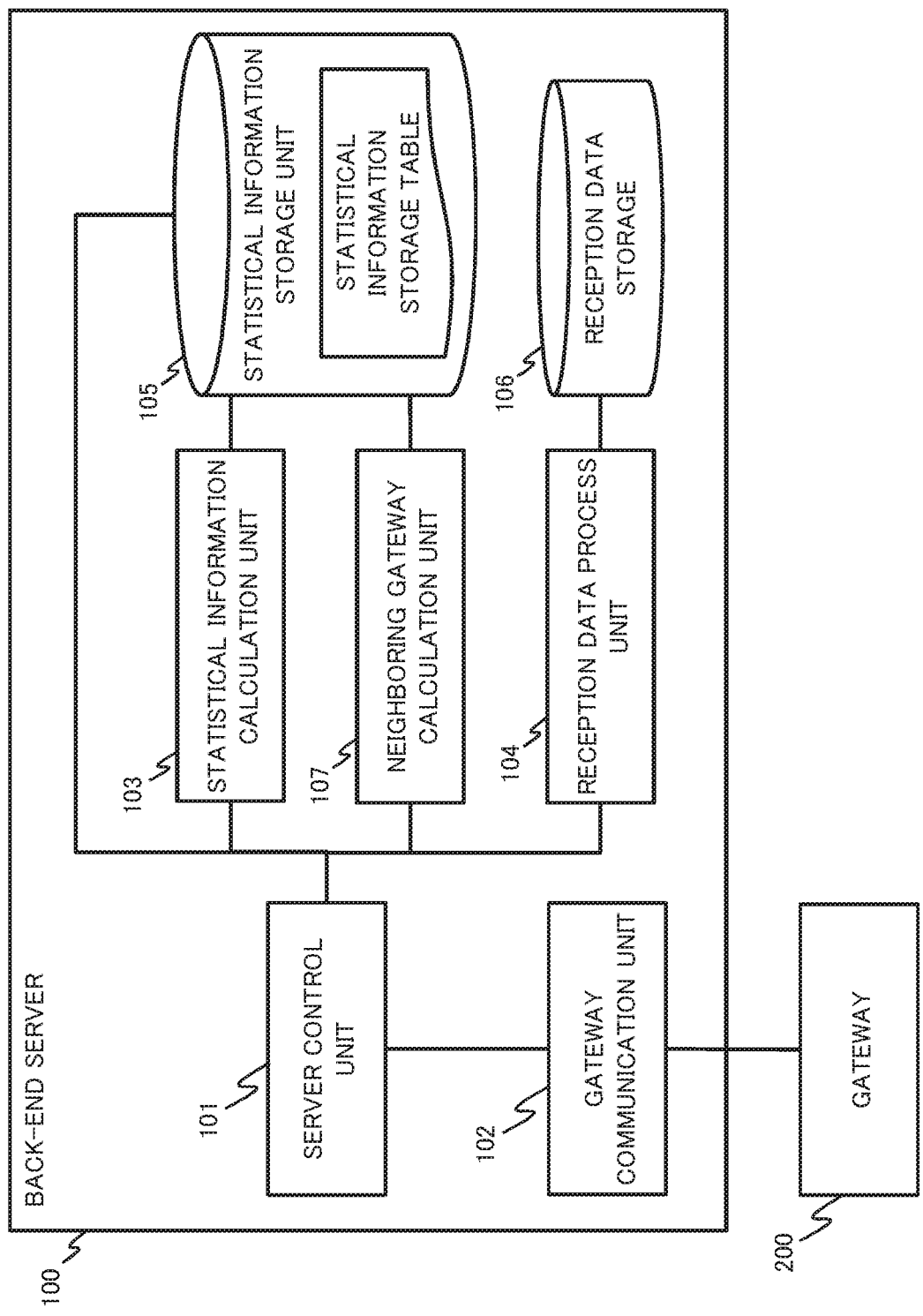
FIG. 1B is a block diagram exemplarily illustrating a functional configuration of a back-end server according to the first example embodiment of the present disclosure.

Hereinafter, a technique according to the present disclosure is further described in detail by using specific example embodiments. Configurations of the following specific example embodiments (and a modified example thereof) are illustrative, and the technical scope according to the present disclosure is not limited thereto. Division (e.g. division based on a functional unit) of components configuring each example embodiment described below is one example that can achieve the example embodiment. A configuration that can achieve each example embodiment is not limited to the following exemplary case and various configurations are assumable. Components configuring each example embodiment described below may be further divided, and one or more components configuring each example embodiment described below may be integrated. When each example embodiment exemplarily described below is achieved by using one or more physical devices, virtual devices, and a combination thereof, one or more components may be achieved by one or more devices or one component may be achieved by using a plurality of devices.

Note that, in the following, a block of data having a certain specific meaning may be referred to as a data item. Further, a set of a plurality of data items may be referred to as a data set.

First Example Embodiment

Hereinafter, a first example embodiment that can achieve the technique according to the present disclosure is described. Devices described below may be mounted as a single device (a physical or virtual device) or may be mounted as a system using a plurality of separate devices (physical or virtual devices). When devices are achieved as a system, components configuring the system may be communicably connected in a wired or wireless manner or via a communication network in which wired/wireless communications are appropriately combined. A hardware configuration that can achieve devices described below is described later.

[Configuration]

A configuration of an information communicating system 1 according to the present example embodiment is described with reference to FIGS. 1A to 1D.

As described in FIG. 1A, the information communicating system 1 according to the present example embodiment is a system including a back-end server 100, a gateway 200, and a sensor device 300. FIG. 1A illustrates a specific example of the information communicating system 1 including L (L is a positive integer) back-end servers 100 (a back-end server (100-1), . . . , a back-end server (100-L)), M (M is a natural number equal to or larger than 2) gateways 200 (a gateway (200-1), a gateway (200-2), . . . , a gateway (200-M)), and N (N is a natural number) sensor devices 300 (a sensor device (300-1), a sensor device (300-2), a sensor device (300-3), . . . , a sensor device (300-N)). Note that, the number of back-end servers 100, gateways 200, and sensor devices 300 each included in the information communicating system is not specifically limited and may be appropriately determined.

In the information communicating system 1, the back-end server 100 may be achieved, for example, as a physical or virtual system distributed to a plurality of housings. Further, the information communicating system 1 includes two or more gateways 200, and gateways 200 are configured to be mutually communicable with another gateway 200 existing in a vicinity thereof. One gateway 200 may be connected to one or more sensor devices 300, and one sensor device 300 may be connected to a plurality of gateways 200.

The sensor device 300 and the gateway 200 are communicably connected by using a communication network 401, and the back-end server 100 and the gateway 200 are communicably connected by using a communication network 402. The communication network 401 and the communication network 402 may be configured by wired communication (e.g. communication conforming to IEEE 802.3 Standard), wireless communication (e.g. communication conforming to IEEE 802.11 Standard), and a combination thereof. A communication protocol used in the communication network 401 and the communication network 402 is not specifically limited and an appropriate communication protocol is employable. The communication network 401 and the communication network 402 may be, but not limited to, an Internet protocol (IP) network such as the Internet and the like.

Hereinafter, components configuring the information communicating system 1 are described.

The back-end server 100 is a sever that executes various types of processing (data analysis processing and the like), based on data collected by using the sensor device 300. As described above, the back-end server 100 may be achieved by a combination of a plurality of physical or virtual information processing devices (such as computers) and may be currently disposed in a general cloud environment. A cloud environment is an environment where, for example, a computing resource used for certain specific processing is appropriately usable as a service via a communication network and the like. As a specific method of constructing a server in a cloud environment, a well-known technique is appropriately employable.

FIG. 1B is a block diagram exemplarily illustrating a functional configuration of the back-end server 100 according to the present example embodiment. As exemplarily illustrated in FIG. 1B, the back-end server 100 includes a server control unit 101 that controls a behavior of a back-end server, a gateway communication unit 102 that communicates with the gateway 200, and a statistical information calculation unit 103 that calculates statistical information of a communication state relating to gateways 200. The back-end server 100 further includes a reception data process unit 104 that processes data received from the gateway 200 and a neighboring gateway calculation unit 107 that detects a neighboring gateway. The back-end server 100 may further include a statistical information storage 105 that stores statistical information calculated in the statistical information calculation unit 103 and a reception data storage 106 that stores data processed in the reception data process unit 104. The statistical information storage 105 and the reception data storage 106 can be achieved by using various types of databases and file systems and may be provided in an outside (e.g. a database server and a storage server providing a storage area) of the back-end server 100.

The back-end server 100 collects, via the gateway 200, data acquired by the sensor device 300 and executes various types of processing (e.g. data analysis processing and the like) by using the collected data. Processing executed by the back-end server 100 by using collected data is not specifically limited and can be appropriately set. At that time, the reception data process unit 104 in the back-end server 100 may execute appropriate process processing (e.g. statistical processing and the like) for data collected from the sensor device 300.

The neighboring gateway calculation unit 107 executes processing of identifying, with respect to a certain gateway 200, another gateway 200 (hereinafter, referred to as a "neighboring gateway 200") existing in a vicinity of the certain gateway 200. The neighboring gateway calculation unit 107 according to the present example embodiment may identify, as a neighboring gateway 200 for a certain gateway 200, for example, another gateway 200 communicable with a sensor device 300 connected to the certain gateway 200. In other words, a gateway 200 communicable with the same sensor device 300 is identified as a neighboring gateway 200.

The present example embodiment is not limited to the above, and the neighboring gateway calculation unit 107 may be configured in such way as to identify a neighboring gateway in accordance with another criterion. The neighboring gateway calculation unit 107 may identify, as a neighboring gateway 200, for example, another gateway 200 having a distance (e.g. a number of hops or the like) from a certain gateway 200 on a network shorter than a specific criterion value. Further, the neighboring gateway calculation unit 107 may identify, as a neighboring gateway 200, for example, another gateway 200 existing on the same network (e.g. the same subnet) as a certain gateway 200. Further, the neighboring gateway calculation unit 107 may identify, as a neighboring gateway 200, another gateway 200 a disposition place of which is close (e.g. a distance between disposition places is equal to or smaller than a criterion value) to a certain gateway 200 when physical dispositions of gateways 200 are known. When, for example, gateways 200 are connected based on radio communication, a range where gateways 200 are communicable may be determined according to a physical distance between gateways 200. Specific processing of the neighboring gateway calculation unit 107 is described later.

The gateway 200 is configured in such a way as to aggregate data from the sensor device 300 and transmit the aggregated data to the back-end server 100. The gateway 200 may be configured as a physical or virtual communicating device or may be achieved by using a physical or virtual information processing device (a computer or the like) mounted with a function of a communication device.

Figure 1C:
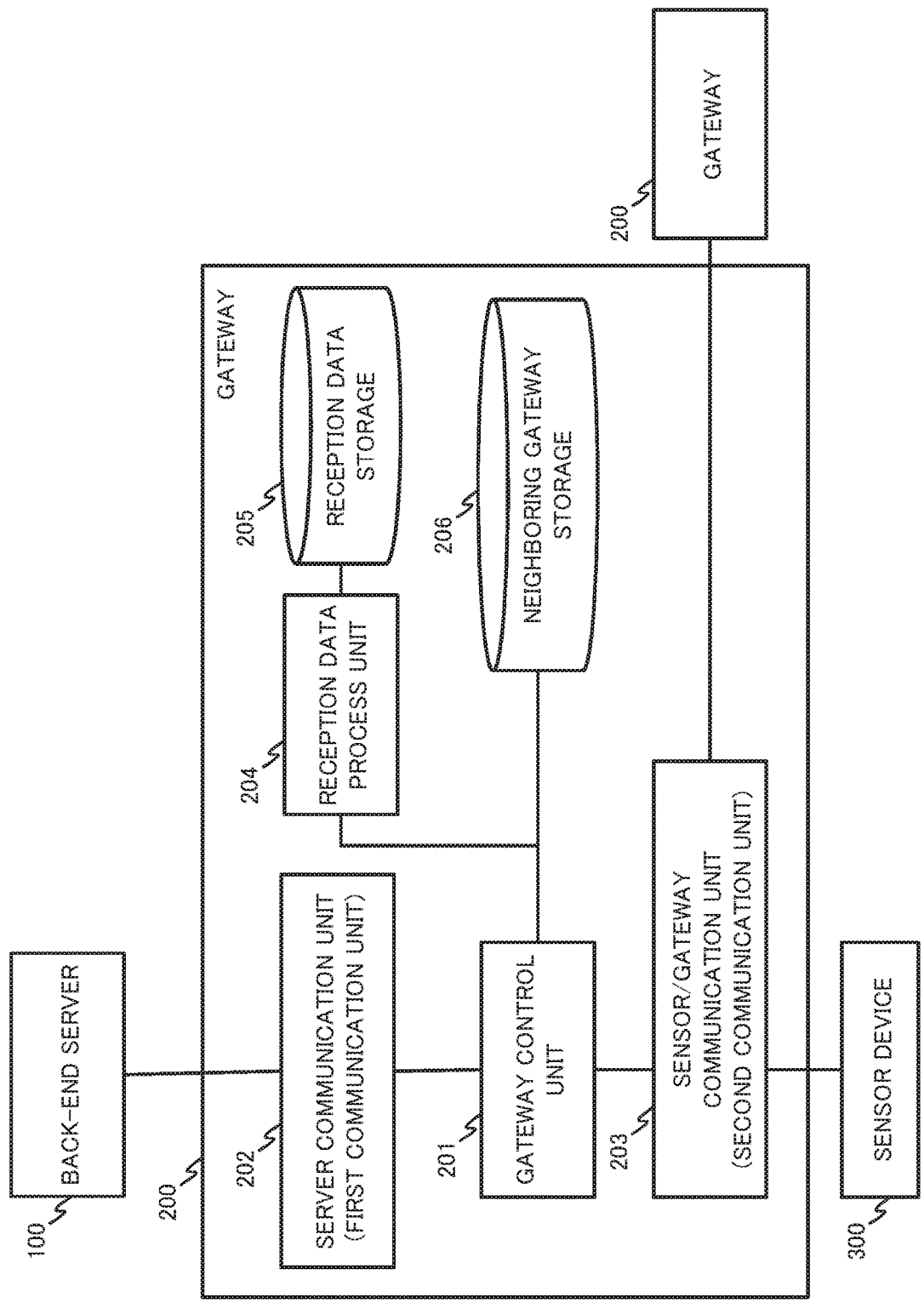
FIG. 1C is a block diagram exemplarily illustrating a functional configuration of a gateway according to the first example embodiment of the present disclosure.

FIG. 1C is a block diagram exemplarily illustrating a functional configuration of the gateway 200 according to the present example embodiment. As exemplarily illustrated in FIG. 1C, the gateway 200 includes a gateway control unit 201 that controls a behavior of the gateway 200 itself, a server communication unit 202 (hereinafter, referred to as a first communication unit 202 in some cases) that performs communication with the back-end server 100, and a sensor/gateway communication unit 203 (hereinafter, referred to as a second communication unit in some cases) that performs communication with the sensor device 300 and another gateway 200. Note that the first communication unit 202 and the second communication unit 203 may be individually mounted or may be mounted by being integrated as a single unit.

The gateway 200 further includes a neighboring gateway storage 206 that stores information capable of identifying another neighboring gateway 200 existing in a local vicinity. The gateway 200 may further include a reception data process unit 204 that processes data received from the sensor device 300 and a reception data storage 205 that stores received data.

The gateway 200 according to the present example embodiment stores, for example, data received from the sensor device 300 in the reception data storage 205. At that time, the reception data process unit 204 may appropriately process data received from the sensor device 300, as necessary, and store the processed data in the reception data storage 205. The gateway 200 may transmit, to the back-end server 100, for example, one or more pieces of reception data stored in the reception data storage 205 in a collected manner (in an aggregated manner). A specific format of data transmitted from the gateway 200 to the back-end server 100 is described later.

The gateway 200 according to the present example embodiment is communicably connected to one or more sensor devices 300 and is communicably connected to another gateway 200. When, for example, due to any cause, the gateway (200-1) and the back-end server (100-1) exemplarily illustrated in FIG. 1A become unable to communicate with each other, the gateway (200-1) can assign transfer of data for the back-end server (100-1) to the gateway (200-1). Thereby, the information communicating system 1 according to the present example embodiment can appropriately transfer communication data even when a failure in communication between a certain gateway 200 and a back-end server 100 occurs. Specific processing for assignment of communication processing between gateways 200 is described later.

According to the present example embodiment, the neighboring gateway storage 206 stores information capable of identifying another neighboring gateway 200 to which transfer processing of data can be assigned. In the neighboring gateway storage 206, for example, information capable of identifying a neighboring gateway 200 may be previously set for gateways 200. Further, the neighboring gateway storage 206 may store information capable of identifying a neighboring gateway 200 identified by the neighboring gateway calculation unit 107 in the back-end server 100.

Figure 1D:
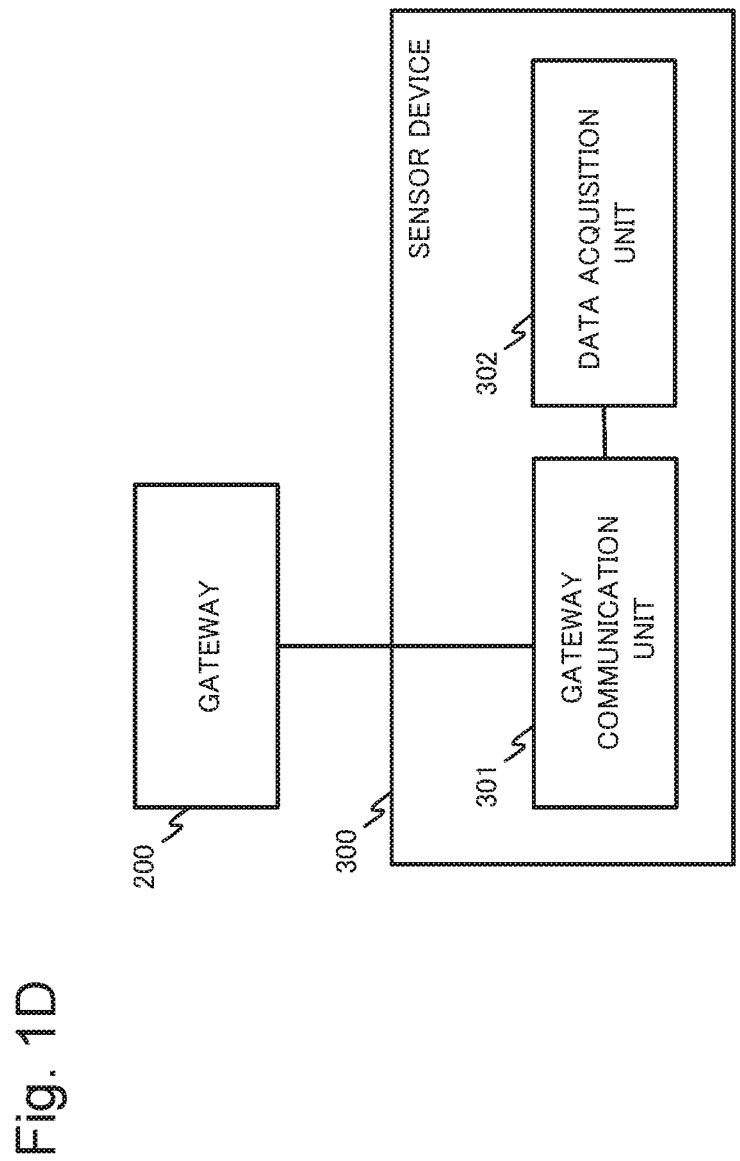
FIG. 1D is a block diagram exemplarily illustrating a functional configuration of a sensor device according to the first example embodiment of the present disclosure.

The sensor device 300 is a device that can acquire information of a real world, for example, by using various types of sensors. FIG. 1D is a block diagram exemplarily illustrating a functional configuration of the sensor device 300 according to the present example embodiment. As exemplarily illustrated in FIG. 1D, the sensor device 300 includes a gateway communication unit 301 that performs communication with the gateway 200. The sensor device 300 may further include a data acquisition unit 302 that acquires information of a real world by using various types of sensors.

A type of the sensor device 300 according to the present example embodiment is not specifically limited, and sensor devices 300 may be mounted with various types of sensors. The sensor device 300 may be mounted with, for example, a temperature sensor, a humidity sensor, an illuminance sensor, a flow rate sensor, an image sensor (camera), a voice sensor (microphone), a vibration sensor, a gyrosensor, an infrared sensor, or the like without limitation thereto. Note that one sensor device 300 may be mounted with a plurality of sensors.

The data acquisition unit 302 in the sensor device 300 acquires data measured by various types of sensors. At that time, the data acquisition unit 302 may convert measurement data to an appropriate format (e.g. analog/digital conversion, conversion to a specified format, and the like). The gateway communication unit 301 transmits data acquired by the data acquisition unit 302 to the gateway 200. A specific format of data transmitted from the sensor device 300 to the gateway 200 is described later.

Note that, according to the present example embodiment, one sensor device 300 may be connected to a plurality of gateways 200. In this case, the sensor device 300 may transmit data, for example, in parallel or sequentially to each gateway 200.

[Operation]

Hereinafter, an operation of the back-end server 100, the gateway 200, and the sensor device 300 according to the present example embodiment configured as described above is described with reference to FIGS. 2 to 8B.

In the following, it is assumed that before a failure in communication between the gateway 200 and the back-end server 100 occurs due to a failure or the like of the gateway 200, data acquired in the sensor device 300 can be normally transmitted to the back-end server 100.

Figure 2:
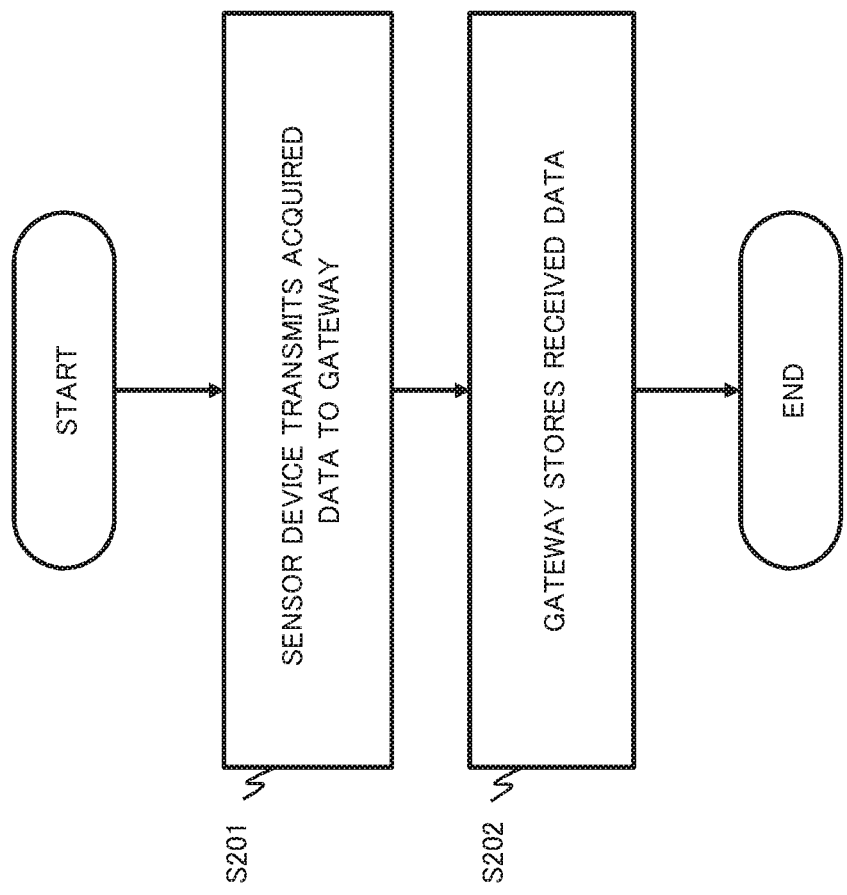
FIG. 2 is a flowchart illustrating one example of an operation of transmitting data from a sensor device to a gateway according to the first example embodiment of the present disclosure.

FIG. 2 is a flowchart illustrating one example of an operation of transmitting data from the sensor device 300 to the gateway 200.

The sensor device 300 acquires information from a real world (i.e., measures any value from a measurement target in a real world) by using a sensor mounted on the sensor device 300. The sensor device 300 transmits data including the acquired information to the gateway 200 by using the gateway communication unit 301 (step S201). Information to be transmitted may be represented by a format (data format), for example, as in FIG. 6. In other words, in a case of a specific example illustrated in FIG. 6, as a data format of information to be transmitted, a format of JavaScript (trademark) Object Notation (JSON) is used. Note that, a data format of information to be transmitted is not limited to the specific example in FIG. 6, and another appropriate format (e.g. Extensible Markup Language (XML)) may be used.

In the case of the specific example illustrated in FIG. 6, data transmitted from the sensor device 300 to the gateway 200 include, for example, a measurement date and time (a "datetime" in FIG. 6), an identifier (a "sensor-id" in FIG. 6) capable of identifying a sensor device 300, and a measurement value (a "temperature" in FIG. 6) acquired from a measurement target. In a "daytime", instead of a measurement date and time, a transmission date and time may be set. FIG. 6 is a specific example in which the sensor device 300 is a temperature sensor, and in a "temperature", a temperature measured by the temperature sensor is set. The present example embodiment is not limited thereto, and as data to be transmitted, appropriate data other than a "temperature" may be set according to a type of a specific sensor mounted on sensor devices 300.

The gateway 200 receives data transmitted from the sensor device 300 by the second communication unit 203 and stores the data in the reception data storage 205 (step S202). At that time, the data received from the sensor device 300 may be appropriately processed by the reception data process unit 204.

Figure 3B:
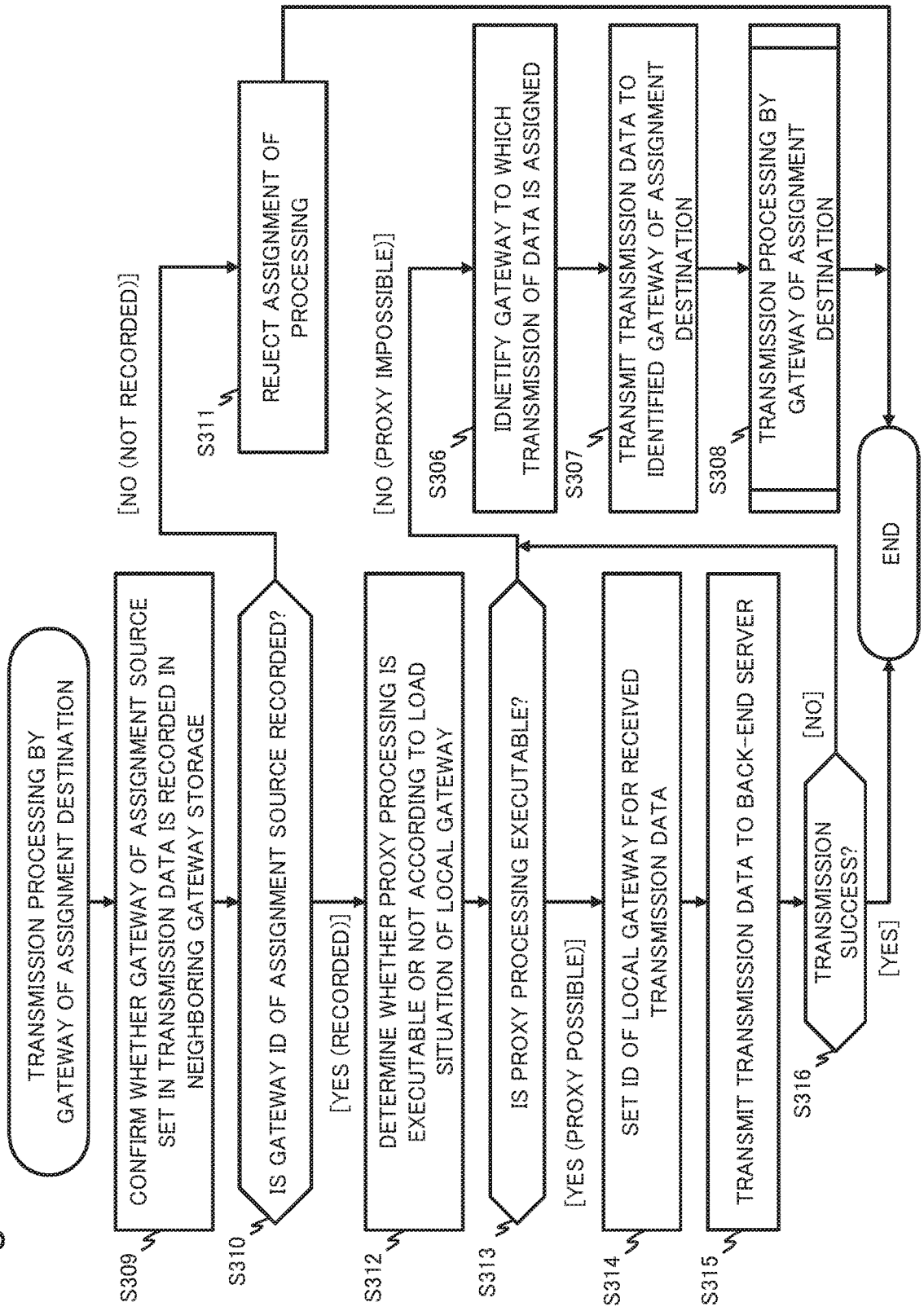
FIG. 3B is a flowchart (2) illustrating one example of an operation of transmitting data from a gateway to a back-end server according to the first example embodiment of the present disclosure.

FIGS. 3A and 3B are a flowchart illustrating one example of an operation of transmitting data from the gateway 200 to the back-end server 100.

As described above, data received by the gateway 200 from the sensor device 300 are stored in the reception data storage 205. The gateway control unit 201 acquires data (hereinafter, referred to as "transmission target data") to be transmitted from the reception data storage 205 to a back-end server (step S301).

The gateway control unit 201 may collectively acquire, as transmission target data, for example, a plurality of pieces of data stored in the reception data storage 205. In other words, transmission target data may include a plurality of pieces of data received from the sensor device 300.

The gateway control unit 201 sets, for transmission target data, an identifier (ID) capable of uniquely identifying itself (step S302).

FIG. 7 is an illustrative diagram illustrating a specific example of transmission target data. In a case of a specific example illustrated in FIG. 7, a plurality of pieces of data received from the sensor device 300 are collectively included in transmission target data. Specifically, transmission target data include, for example, an identifier (a "gateway-id" in FIG. 7) capable of identifying a gateway 200 that transmits the transmission target data. For transmission target data exemplarily illustrated in FIG. 7, further, a date and time (a "datetime") in which transmission target data are transmitted is set. The transmission target data exemplarily illustrated in FIG. 7 further include data received from two sensor devices (a device in which a "sensor-id" is a "temp-sensor1" and a device in which a "sensor-id" is a "temp-sensor2").

The gateway control unit 201 transmits transmission target data to the back-end server 100 by using the first communication unit 202 (step S303).

When transmission of transmission target data to the back-end server 100 is normally finished (YES in step S304), the gateway control unit 201 deletes the transmitted transmission target data from the reception data storage 205 (step S305).

When transmission of transmission target data fails (NO in step S304), the gateway control unit 201 identifies, from the neighboring gateway storage 206, a gateway 200 (neighboring gateway 200) to which data transmission is assigned and acquires information thereof (step S306).

The gateway control unit 201 transfers transmission target data to the identified neighboring gateway 200 (step S307).

In the specific example illustrated in FIG. 1A, it is assumed that, for example, the gateway (200-1) and the gateway (200-2) are mutually neighboring gateways and transmission of transmission target data from the gateway (200-1) to the back-end server (100-1) fails. In this case, the gateway (200-1) assigns transmission processing of transmission target data to the gateway (200-2) and transfers the transmission target data to the gateway (200-2).

Hereinafter, transmission processing (step S308) of transmission target data in another gateway 200 to which transmission processing is assigned from a certain gateway 200 is described with reference to FIG. 3B. Note that, in the following, another gateway 200 to which transmission processing is assigned from a certain gateway 200 may be referred to as a relay gateway. In this case, a certain gateway 200 and another gateway 200 may be mutually neighboring gateways 200.

A neighboring gateway 200 to which transmission processing of transmission target data is assigned confirms whether a gateway 200 of an assignment source is recorded in a neighboring gateway storage 206 in the neighboring gateway 200 to which the transmission processing is assigned (step S309). More specifically, a gateway control unit 201 in a neighboring gateway 200 confirms whether an ID (a "gateway-id") of a gateway 200 of an assignment source included in transferred transmission target data is recorded in a neighboring gateway storage 206.

When the gateway 200 of the assignment source is not recorded in the neighboring gateway storage 206 (NO in step S310), the gateway control unit 201 determines that incorrect data are received and rejects assignment of transmission processing (step S311).

When the gateway 200 of the assignment source is recorded in the neighboring gateway storage 206 (YES in step S310), the gateway control unit 201 confirms a load situation of the neighboring gateway 200 to which the transmission processing is assigned and determines whether the gateway 200 to which the transmission processing is assigned can accept assignment of transmission processing (step S312).

When a load on the gateway 200 to which the transmission processing is assigned is high and it is difficult to accept assignment (NO in step S313), the gateway control unit 201 further assigns transmission processing to a neighboring gateway (i.e., another gateway 200 stored in the neighboring gateway storage 206) other than the gateway 200 of the assignment source (steps S306 to S308 in FIG. 3B). Note that steps S306 to S308 in FIG. 3B may be similar to steps S306 to S308 in FIG. 3A.

When assignment is acceptable (YES in step S313), the gateway control unit 201 accepts assignment and sets, for transmission target data received from the gateway 200 being the assignment source, an identifier (ID) representing that transmission processing is relayed (step S314).

FIG. 8A is an illustrative diagram illustrating a specific example of transmission target data relayed by a neighboring gateway 200. As exemplarily illustrated in FIG. 8A, the gateway control unit 201 sets an identifier (a "relay-gateway" in FIG. 8A) for transmission target data received from a gateway 200 being an assignment source. In transmission target data exemplarily illustrated in FIG. 8A, a portion other than a "relay-gateway" may be similar to transmission target data exemplarily illustrated in FIG. 7.

When transmission target data are relayed by a plurality of gateways 200 (i.e., when a plurality of gateways 200 are assigned with transmission processing), as exemplarily illustrated in FIG. 8B, an ID of each of the gateways 200 making a relay may be set as a "relay-gateway".

A neighboring gateway 200 transmits transmission target data provided with an identifier to a back-end server 100 (step S315). Note that, when data transmission to the back-end server 100 fails (NO in step S316), data transmission is assigned to another neighboring gateway, based on processing from steps S306 to S308.

In the specific example illustrated in FIG. 1A, it is assumed that, for example, the gateway (200-1) and the gateway (200-2) are mutually neighboring gateways and transmission of transmission target data from the gateway (200-1) to the back-end server (100-1) fails. Another gateway (200-2) having received transmission target data transferred from the gateway (200-1) confirms whether the gateway (200-1) being an assignment source is a neighboring gateway 200 of the gateway 200 to which the transmission processing is assigned (step S309). In this case, the gateway (200-1) of the assignment source is a neighboring gateway 200 of the gateway (200-2) (YES in step S310). The gateway (200-2) confirms a load situation of the gateway 200 to which the transmission processing is assigned (steps S312 and S313) and sets, when transmission processing is acceptable, an ID of the gateway 200 for transmission target data (step S314). In the case of the specific example exemplarily illustrated in FIG. 8A, as a "relay-gateway", a "gateway 2" is set. The gateway (200-2) transmits transmission target data in which an ID is set to the back-end server (100-1) (step S315).

FIG. 4 is a flowchart illustrating one example of an operation when the back-end server 100 receives transmission target data.

The back-end server 100 (specifically, the server control unit 101) receives transmission target data in the gateway communication unit 102 (step S401) and stores the received data in the reception data storage 106 (step S402). Note that, at that time, data appropriately processed by the reception data process unit 104 may be stored in the reception data storage 106.

The server control unit 101 confirms whether an ID of a gateway 200 to which transmission processing of the data is assigned is included in the received data (step S403).

When an ID of a relay gateway is not included in the received data (NO in step S404), the server control unit 101 provides the received data to the statistical information calculation unit 103. The statistical information calculation unit 103 records information such as a date and time of data reception, a reception data size, and the like relating to the received data in the statistical information storage 105 (step S405).

When an ID of a relay gateway is included in the received data (YES in step S404), the server control unit 101 acquires, from the received data, an ID (a "gateway-id" in the specific examples of FIGS. 8A and 8B) of a gateway 200 of a transmission source (step S406).

When an ID of a relay gateway is included in the received data, a transfer of transmission target data fails between a gateway 200 of a transmission source of the transmission target data and the back-end server 100. Therefore, the server control unit 101 stores, in the statistical information storage 105, a fact that a communication error occurs in the gateway 200 of the transmission source (step S407). At that time, the server control unit 101 may instruct the statistical information calculation unit 103 to record the communication error.

The server control unit 101 confirms whether a plurality of IDs of relay gateways 200 are included in the received data (step S408). In other words, the server control unit 101 confirms whether the received data are transferred by two or more relay gateways 200.

When a plurality of IDs of relay gateways 200 are included (YES in step S409), the server control unit 101 stores, in the statistical information storage 105, a fact that a communication error occurs also with respect to a relay gateway 200 recorded as a halfway path (step S410). Specifically, the server control unit 101 stores, in the statistical information storage 105, when, for example, a plurality of IDs of relay gateways 200 are included in a "relay-gateway" included in the received data, a fact that an error of communication with the back-end server 100 occurs with respect to a relay gateway 200 identified by an ID other than an ID recorded last.

A problem in communication between a relay gateway 200 making a relay last and the back-end server 100 does not occur. Therefore, data stored in the statistical information storage 105 are updated in order to preferentially use this relay gateway 200 (step S411).

Similarly, when ID of a relay gateway 200 included in the received data is one (NO in step S409), processing of step S411 may be executed for this relay gateway 200.

By using specific examples illustrated in FIGS. 9A and 9B, such processing is described. FIGS. 9A and 9B each are an illustrative diagram illustrating a specific example of a statistical information storage table stored in the statistical information storage 105 of the back-end server 100.

As exemplarily illustrated in FIG. 9A, a statistical information storage table records a gateway ID (901 in FIG. 9A) capable of identifying each gateway 200 communicably connected to the back-end server 100. Further, a statistical information storage table records, in association with a gateway ID, a last data reception time (902), an average data size (903), an error occurrence number (904), and a relay priority level (905). Note that, as exemplarily illustrated in FIG. 9B, a statistical information storage table may further record a communication frequency (906).

A last data reception time represents a time at which data are received last from a gateway 200 identified by a gateway ID. Further, a communication frequency represents the number of communications performed between a gateway 200 identified by a gateway ID and the back-end server 100 in a specific period (e.g. a unit time such as a last one hour and the like). Note that the communication may include assignment of communication processing based on a relay gateway 200. For example, the server control unit 101 (or the statistical information calculation unit 103) may update, when receiving data from the gateway 200, a last data reception time and a communication frequency in step S405. Note that, according to the present example embodiment, the server control unit 101 may record, in a time-series manner, for example, information (e.g. a reception time and the like) capable of identifying a timing of receiving data from the gateway 200. The server control unit 101 may store information capable of identifying a timing of receiving data from the gateway 200, for example, in the reception data storage 106. Thereby, the server control unit 101 can calculate a communication frequency, based on this information.

An average data size represents an average of sizes of data transferred between a gateway 200 identified based on a gateway ID and the back-end server 100. In this case, it is conceivable that an average data size represents a communication volume between a gateway 200 identified based on a gateway ID and the back-end server 100. An average data size may represent an average of sizes of data transferred between a gateway 200 identified based on a gateway ID and the back-end server 100, for example, in a certain specific period (e.g. a unit time such as a last one hour and the like). The server control unit 101 (or the statistical information calculation unit 103) may calculate, for example, when receiving data from a gateway 200, a size of the data and update the average data size in step S405. When the average data size is large, it is conceivable that a load on communication processing in the gateway 200 is high.

An error occurrence number represents the number of occurrence of errors in a specific period (e.g. a last one hour or the like). Specifically, the back-end server 100 may update (e.g. increments), in steps S407 and S410, an error occurrence number for other relay gateways 200 except a gateway 200 of a transmission source and a gateway 200 making a relay last.

A relay priority level represents a priority level when each gateway 200 is used as a relay gateway 200. In the case of the specific example exemplarily illustrated in FIGS. 9A and 9B, as a priority level, "high" and "low" are set. The present example embodiment is not limited thereto, and as a relay propriety level, a multi-stage propriety level (e.g. numerical values and the like) may be set. The server control unit 101 may set, in step S411, for example, a high priority value (e.g. "high") as a relay priority level for a gateway 200 that succeeds in communicating with the back-end server 100 and set a low priority value (e.g. "low") as a relay priority level for a gateway 200 that fails in communicating with the back-end server 100.

FIG. 5 is a flowchart illustrating a specific example of a method of setting, for each gateway 200, information stored in the neighboring gateway storage 206. Processing exemplarily illustrated in FIG. 5 may be executed in asynchronization with (in parallel to) data transmission processing illustrated in FIGS. 3A to 4. In the flowchart exemplarily illustrated in FIG. 5, steps S501 to 505 are executed in the back-end server 100, and step S506 is executed in gateways 200.

The neighboring gateway calculation unit 107 of the back-end server 100 acquires, from gateways 200, a list of sensor devices 300 with which each of the gateways 200 is communicable (step S501).

In the case of the configuration exemplarily illustrated in FIG. 1A, the back-end server (100-1) can acquire, from the gateway (200-1), a list including the sensor device (300-1) and the sensor device (300-2). Further, the back-end server (100-1) can acquire, from the gateway (200-2), a list including the sensor device (300-2) and the sensor device (300-3).

The neighboring gateway calculation unit 107 compares lists of sensor devices 300 acquired from gateways 200 and identifies gateways 200 communicable with the same sensor device 300 as neighboring gateways 200, respectively (step S502).

In the case of the configuration exemplarily illustrated in FIG. 1A, the sensor device (300-2) is determined as a sensor device 300 communicable from both of the gateway (200-1) and the gateway (200-2). Thereby, the neighboring gateway calculation unit 107 determines the gateway (200-1) and the gateway (200-2) as neighboring gateways 200, respectively.

The neighboring gateway calculation unit 107 refers to a statistical information storage table stored in the statistical information storage 105 and acquires, for each gateway 200, statistical information relating to communication with a local device (back-end server 100) (step S503).

Specifically, the neighboring gateway calculation unit 107 refers to a statistical information storage table and acquires a communication error occurrence number, an average transmission/reception data size, and the like. When the statistical information storage table includes a communication frequency, the neighboring gateway calculation unit 107 may acquire a communication frequency in addition to the above.

The neighboring gateway calculation unit 107 sets, based on the acquired statistical information, a priority level for each gateway 200 (step S504). The neighboring gateway calculation unit 107 may set a priority level for each gateway 200, for example, by considering a possibility of success in communication with a local device (back-end server 100) and a load on communication in each gateway 200. The neighboring gateway calculation unit 107 may set, for each gateway 200, for example, a higher priority level as a possibility of success in communication with a local device (back-end server 100) is higher (i.e., may set a priority level in such a way that a priority order of a gateway 200 having a higher possibility of success in communication is higher). Further, the neighboring gateway calculation unit 107 may set, for each gateway 200, a higher priority level as a load on communication is lower (i.e., may set a priority level in such a way that a priority order of a gateway 200 on which a lower communication load is imposed is higher). The neighboring gateway calculation unit 107 sets a priority level for each gateway 200, for example, based on any one or more of a communication error occurrence number, an average transmission/reception data size, and a communication frequency.

Specifically, the neighboring gateway calculation unit 107 may set a priority level for each gateway 200, for example, based on the following processing.

(1) The neighboring gateway calculation unit 107 determines whether a communication error occurs in a unit time. When a communication error occurs, a priority level for a gateway 200 in which the communication error occurs is decreased.

(2) When a communication error does not occur, the neighboring gateway calculation unit 107 decreases a priority level of a gateway in which a communication frequency in a unit time is large. Specifically, the neighboring gateway calculation unit 107 determines that a load on a gateway in which a communication frequency in a unit time is larger than a certain specific threshold is high and decreases a priority level of the gateway. Note that the threshold may be previously set or may be separately provided.

(3) The neighboring gateway calculation unit 107 determines whether with respect to gateways having low communication frequency, a load on each gateway 200 is high from a size of data flowing in a single communication. The neighboring gateway calculation unit 107 decreases, when a load on a certain gateway 200 is high, a priority level of the gateway 200.

As another example, the neighboring gateway calculation unit 107 may focus attention on a communication error occurrence number and set, with respect to gateways 200, a high priority level in ascending order of a communication error occurrence number.

As further another example, the neighboring gateway calculation unit 107 may focus attention on an average transmission/reception data size and set, with respect to gateways 200, a higher priority level in ascending order of an average transmission/reception data size. An average transmission/reception data size may be related to loads on communication processing of gateways 200. Therefore, the neighboring gateway calculation unit 107 may set a higher priority level for a gateway 200 in which, for example, an average transmission/reception data size is small (i.e., a load on communication processing is relatively low). Similarly, the neighboring gateway calculation unit 107 may focus attention on a communication frequency and set a higher priority level for a gateway 200 in which a communication frequency is low (a load on communication processing is relatively low).

As still further another example, the neighboring gateway calculation unit 107 may focus attention on a communication frequency and set a higher priority level for a gateway 200 in which a communication frequency is low.

As still further another example, the neighboring gateway calculation unit 107 may calculate a priority level by using a specific calculation equation from a communication error occurrence number, an average transmission/reception data size, and a communication frequency. As the calculation equation, for example, a calculation equation in which as a communication error occurrence number is lower and an average transmission/reception data size is smaller, a higher priority level is calculated can be used. As a simple example of the calculation equation, for example, following equation 1 and equation 2 may be used.

(Priority level of each gateway 200)=(A/(average data size))+(B/(error occurrence number))  (Equation 1)

In equation 1, A and B each are an appropriately selectable coefficient and "/" is a division symbol.

(Priority level of each gateway 200)=(A/(average data size))+(B/(error occurrence number))+(C/(communication frequency))  (Equation 2)

In n equation 2, A, B, and C each are an appropriately selectable coefficient and "/" is a division symbol.

The neighboring gateway calculation unit 107 reports (transmits) a list of neighboring gateways 200 provided with a priority level to gateways 200 via the gateway communication unit 102 (step S505). A list of neighboring gateways 200 provided with a priority level may be represented in a format, for example, as exemplarily illustrated in FIG. 10, but the present example embodiment is not limited thereto.

Each gateway 200 updates the neighboring gateway storage 206 by using a list of neighboring gateways 200 received from the back-end server 100. Thereby, each gateway 200 can select, when failing in communication with the back-end server 100, another gateway 200 to which communication processing is assigned, according to position information of gateways (whether to be neighboring gateways) and a priority calculated by using statistical information such as a communication frequency per unit time, a transmission/reception data volume, and the like.

According to the information communicating system 1 of the present example embodiment configured as described above, even when a failure in communication between the gateway 200 and the back-end server 100 occurs, data acquired in the sensor device 300 can be transferred to the back-end server 100 via another gateway 200. In other words, the information communicating system 1 according to the present example embodiment can appropriately transfer communication data even in a situation where a failure occurs. The reason is as follows.

The gateway 200 according to the present example embodiment can appropriately identify a neighboring gateway 200 even a failure occurs in communication with the back-end server 100. In other words, the gateway 200 can identify another neighboring gateway 200 to which transfer processing of data is assigned, according to position information of gateways (whether to be neighboring gateways) and a priority level calculated by using statistical information such as a communication frequency per unit time, a transmission/reception data volume (communication volume), and the like. The gateway 200 transmits data to the identified neighboring gateway 200 and the neighboring gateway 200 transfers the data to a back-end server. Further, when it is difficult for a certain neighboring gateway 200 to accept assignment of transfer processing of data, the neighboring gateway 200 can further assign transfer processing to another neighboring gateway 200. Thereby, any neighboring gateway 200 transfers data to the back-end server 100, and thereby data acquired in the sensor device 300 can be transferred finally to the back-end server 100.

Further, as described above, the back-end server 100 provides, with respect to gateways 200, a list of position information of gateways 200 and neighboring gateways 200 in which a priority level calculated by using statistical information such as a communication frequency per unit time, a transmission/reception data volume, and the like is set. It is conceivable that the priority level is reflected with a load situation of each gateways 200. Thereby, the gateway 200 can select, among other running gateways 200, according to a load on each of the gateways 200, an appropriate relay gateway 200.

MODIFIED EXAMPLE

Hereinafter, a modified example of the first example embodiment is described. According to the present modified example, processing of the neighboring gateway calculation unit 107 in the back-end server 100 is modified from the first example embodiment. Other configurations in the back-end server 100, the gateway 200, and the sensor device 300 may be similar to the first example embodiment.

According to the first example embodiment, the neighboring gateway calculation unit 107 in the back-end server 100 directly acquires a list of communicable sensors from gateways 200. In contrast, a neighboring gateway calculation unit 107 according to the present modified example acquires information relating to a sensor device 300 and information relating to gateways 200 (a gateway 200 of a transmission source and a relay gateway 200) recorded in a reception data storage 106. Information capable of identifying a gateway 200 through which data transmitted from the sensor device 300 passes until reaching a back-end server 100 is recorded on reception data stored in the reception data storage. Thereby, the neighboring gateway calculation unit 107 according to the present modified example may determine, by using acquired information, for example, that a gateway 200 of a transmission source and the sensor device 300 are communicable with each other.

Second Example Embodiment

Hereinafter, a second example embodiment that is a basic example embodiment of the technique according to the present disclosure is described. The second example embodiment is an example embodiment that is a basis of the first example embodiment described above and a modified example thereof.

Figure 11:
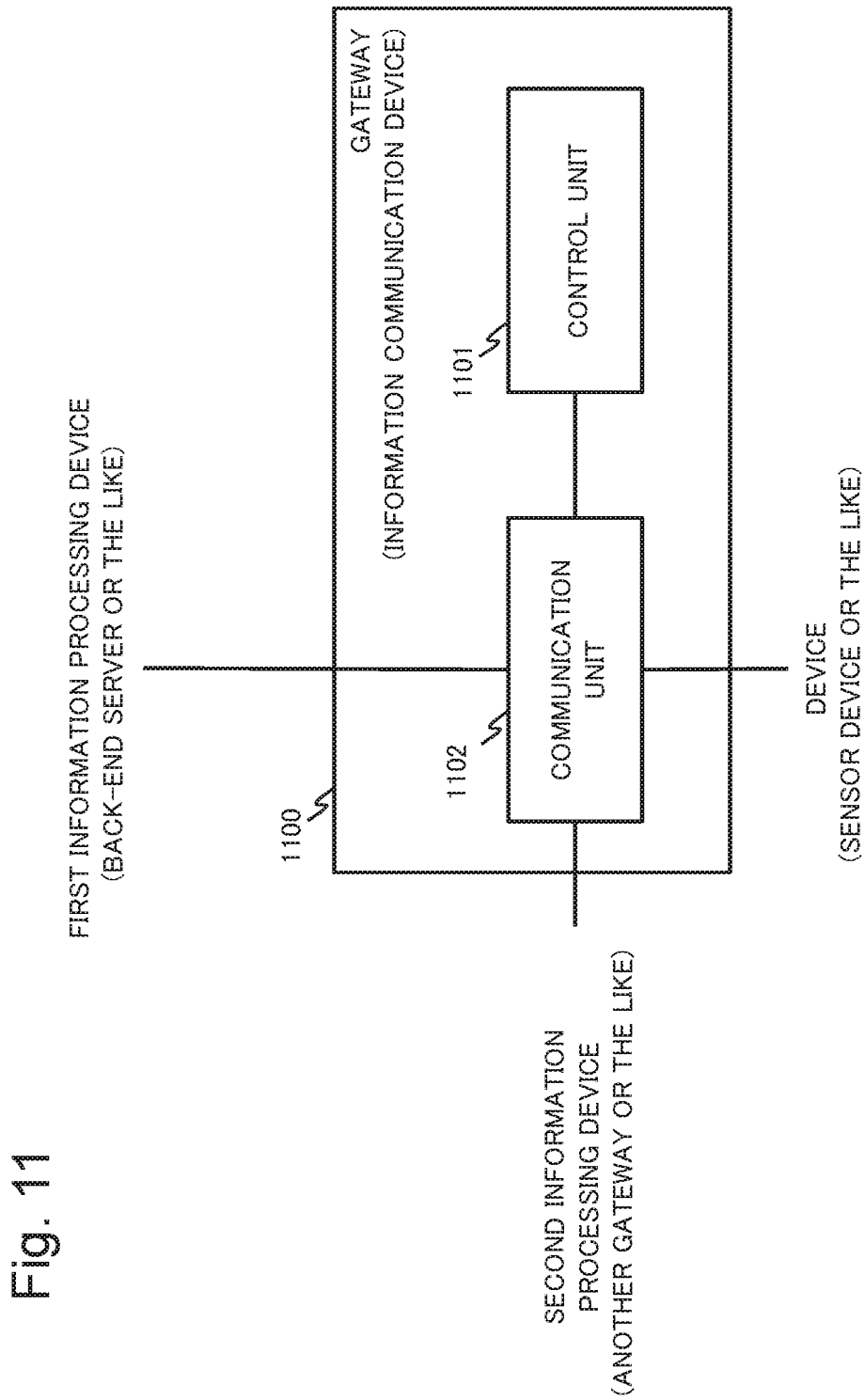
FIG. 11 is a block diagram exemplarily illustrating a functional configuration of an information communicating device according to a second example embodiment of the present disclosure.

FIG. 11 is a block diagram exemplarily illustrating a functional configuration of a gateway 1100 according to the present example embodiment. As exemplarily illustrated in FIG. 11, the gateway 1100 according to the present example embodiment includes a control unit 1101 and a communication unit 1102. These components configuring the gateway 1100 may be appropriately communicably connected. The gateway 1100 according to the present example embodiment may be achieved by using an information processing device such as a computer and the like or may be achieved by a combination of pieces of dedicated hardware. Note that the gateway 1100 may be referred to as an information communicating device 1100.

Hereinafter, components of the gateway 1100 are described.

The communication unit 1102 (a communication means) is configured to be capable of transmitting/receiving data via a communication network and receives data transmitted from a device. A device may be, for example, the sensor device 300 according to the first example embodiment. Further, a first information processing device may be the back-end server 100 according to the first example embodiment. The communication unit 1102 may be mounted, for example, in such a way as to achieve a function similar to the first communication unit 202 and the second communication unit 203 configuring the gateway 200 according to the first example embodiment.

The control unit 1101 (a control means) generates transmission data including data received by the communication unit 1102 and controls the communication unit 1102 in such a way as to transmit the generated transmission data to the first information processing device.

The control unit 1101 identifies, when transmission of transmission data to the first information processing device fails, a second information processing device to which processing of transmitting the transmission data is assigned, based on the following information relating to one or more second information processing devices that are other information processing devices capable of transmitting the transmission data to the first information processing device. In other words, the control unit 1101 identifies a second information processing device to which processing of transmitting the transmission data is assigned, according to information (position information) relating to disposition of second information processing devices and a priority level determined according to statistical information relating to communication in the second information processing devices. The control unit 1101 controls the communication unit 1102 in such a way as to transmit transmission data to the identified second information processing device.

The second information processing device may be, for example, a device configured similarly to the gateway 1100 or may be a device configured similarly to the gateway 200 according to the first example embodiment. The control unit 1101 may be mounted, for example, in such a way as to achieve a function similar to the gateway control unit 201 configuring the gateway 200 according to the first example embodiment.

Information (position information) relating to disposition of a second information processing device may be, for example, information capable of determining whether a local device (gateway 1100) and a second information processing device exist in a vicinity. Position information may be, for example, information capable of identifying a "neighboring gateway 200" according to the first example embodiment.

Specifically, position information may include information identifying a device communicable with both of a local device (gateway 1100) and a second information processing device. In this case, the gateway 1100 can identify, as a second information processing device existing in a vicinity, a second information processing device communicable with the same device.

The present example embodiment is not limited thereto, and position information may be information capable of identifying a neighboring second information processing device in accordance with another criterion. For example, a distance (e.g. the number of hops or the like) from a local device (gateway 1100) on a network may be included in position information. In this case, the gateway 1100 can identify, as a second information processing device existing in a vicinity, another second information processing device in which a distance on a network is shorter than a specific criterion value. Further, for example, a network address of a second information processing device may be included in position information. In this case, the gateway 1100 can identify, as a second information processing device existing in a vicinity, another second information processing device existing on the same network (e.g. the same subnet). Further, when physical disposition places of second information processing devices are known, such disposition places may be included in position information. In this case, the gateway 1100 can identify, as a second information processing device existing in a vicinity, another second information processing device close to a physical disposition place of a local device (e.g. a distance between disposition places is equal to or smaller than a criterion value).

A priority level is, for example, a value determined according to statistical information relating to communication in second information processing devices. Specifically, a priority level may be calculated, for example, based on position information (a position relation between the gateway 1100 and a second information processing device) of second information processing devices and any one or more of pieces of statistical information such as a transmission/reception data volume in a second information processing device, a communication frequency per unit time in a second information processing device, and the number of occurrence of communication failures between a second information processing device and a first information processing device. Based on these pieces of statistical information, for example, a relatively high priority level may be set for a second information processing device in which a load on communication processing is relatively low. Further, based on these pieces of statistical information, for example, a relatively high priority level may be set for a second information processing device in which an occurrence frequency of communication failures is relatively low.

A priority level of a second information processing device may be calculated, for example, by the gateway 1100. In this case, the gateway 1100 may acquire, from each second information processing device, statistical information relating to communication in the second information processing device and may calculate a propriety level thereof. Further, a priority level of a second information processing device may be appropriately provided from an external device such as a first information processing device and the like. In this case, for example, a first information processing device may acquire, from each second information processing device, statistical information relating to communication in the second information processing device, calculate a propriety level thereof, and provide the calculated propriety level to the gateway 1100.

Second information processing devices and a list of priority levels thereof may be previously set in the gateway 1100. Further, second information processing devices and a list of priority levels thereof may be appropriately provided from an external device such as a first information processing device. The control unit 1101 may store a list of other second information processing devices in which a priority level is set, by using an appropriate storage method such as a database, a file, and the like.

An operation of the gateway 1100 according to the present example embodiment configured as described above is described.

The gateway 1100 receives data from a device. When, for example, a device includes a sensor, received data may include a measurement value measured by the sensor. The gateway 1100 may store a plurality of pieces of received data.

The gateway 1100 transmits data received from a device to a first information processing device. At that time, the gateway 1100 may collectively transmit a plurality of pieces of received data to a first information processing device. Note that, at that time, the gateway 1100 may appropriately process received data such that an ID capable of identifying a local device is added and transmit the processed data to a first information processing device.

The gateway 1100 selects, when communication with a first information processing device fails, for example, due to a communication failure or the like, a second information processing device to which communication processing is assigned, according to a priority level set for another second information processing device. The gateway 1100 may, for example, refer to other second information processing devices and a list of priority levels thereof and select a second information processing device having a highest priority level.

The gateway 1100 transfers data received from a device to the selected second information processing device. The second information processing device to which the data are transferred from the gateway 1100 may transfer the data to a first information processing device According to the gateway 1100 of the present example embodiment configured as described above, even in a situation where a failure occurs, communication data can be appropriately transferred. The reason is that the gateway 1100 can select, when a failure occurs, an appropriate second information processing device according to a priority level and assign transmission processing of data to the selected second information processing device.

The technique according to the present disclosure described by using example embodiments and a modified example as described above is suitably applicable when, for example, in a system using IoT, there are a plurality of gateways that aggregate data from a sensor device and transmit the aggregated data to a back-end server.

<Configurations of Hardware and a Software Program (Computer Program)>

Hereinafter, a hardware configuration able to achieve the back-end server 100 and a gateway (200, 1100) according to example embodiments and a modified example is described.

In the following description, the back-end server 100 and a gateway (200, 1100) described according to the example embodiments are collectively referred to simply as an "information communicating device".

Information communicating devices described according to the example embodiments each may include one or a plurality of dedicated hardware devices. In this case, components illustrated in the figures (e.g. FIGS. 1B, 1C, and 11) may be achieved as hardware (an integrated circuit mounted with a processing logic and the like) integrated partially or entirely. In other words, when an information communicating device is achieved, for example, by a hardware device, components of the information communicating device may be mounted as an integrated circuit (e.g. a system on a chip (SoC) and the like) capable of providing functions thereof. In this case, for example, data included in components of an information communicating device may be stored on a random access memory (RAM) area or a flash memory area integrated in an SoC.

In this case, the back-end server 100 may be achieved, for example, by using one or more processing circuitries, communication circuits, storage circuits (storage elements) and the like capable of achieving functions of the server control unit 101, the gateway communication unit 102, the statistical information calculation unit 103, the reception data process unit 104, the statistical information storage 105, the reception data storage 106, and the neighboring gateway calculation unit 107. The gateway 200 may be achieved, for example, by using one or more processing circuitries, communication circuits, storage circuits (storage elements) and the like capable of achieving functions of the gateway control unit 201, the server communication unit 202, the sensor/gateway communication unit 203, the reception data process unit 204, the reception data storage 205, and the neighboring gateway storage 206. The gateway 1100 may be achieved by using one or more processing circuitries, communication circuits, storage circuits (storage elements) and the like capable of achieving functions of the control unit 1101 and the communication unit 1102. Note that, with regard to mounting of a circuit configuration that achieves information communicating devices, various variations are assumable.

In a case where an information communicating device is configured by a plurality of hardware devices, these hardware devices may be communicably connected by an appropriate communication method (in a wired or wireless manner or by a combination thereof).

Figure 12:
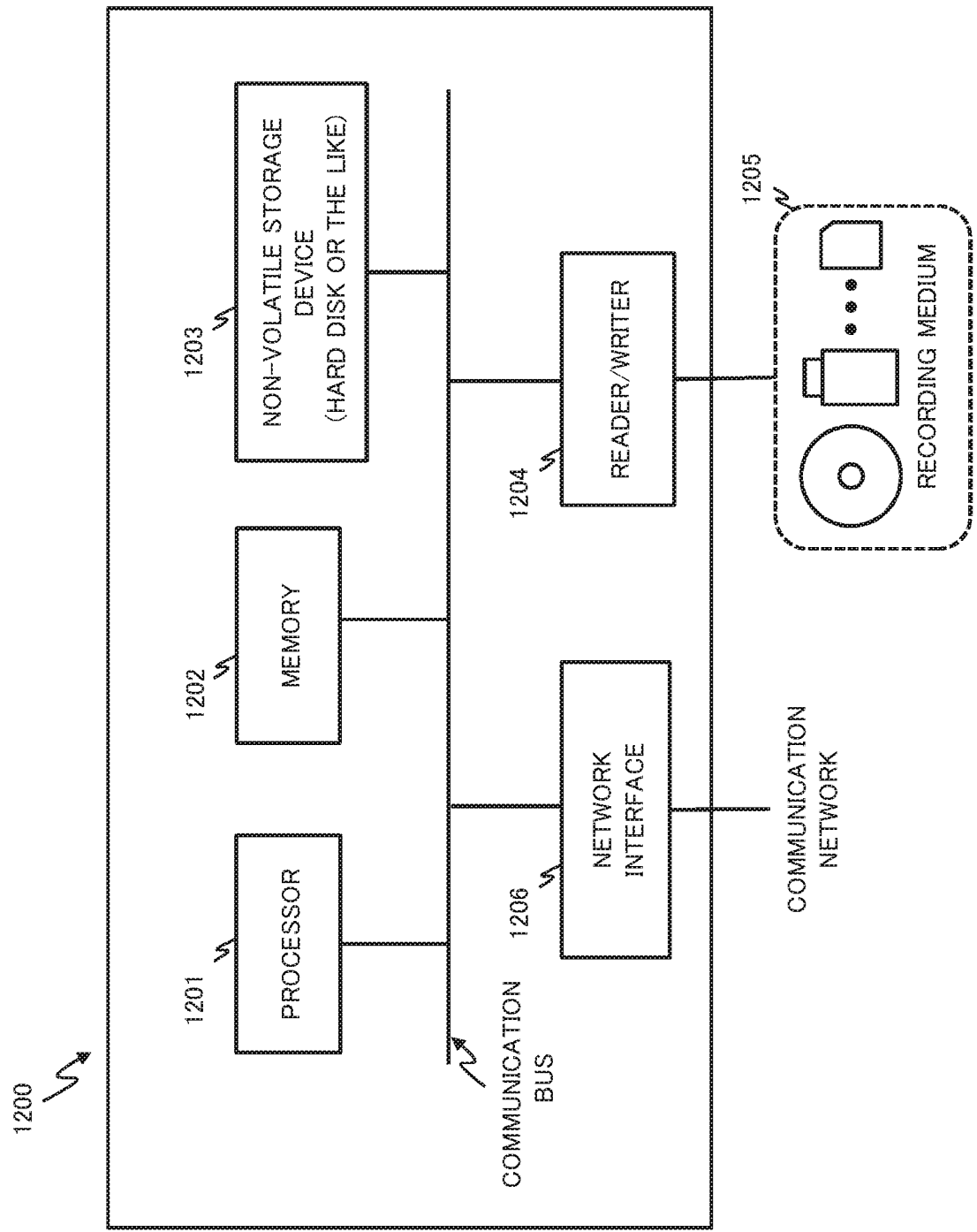
FIG. 12 is an illustrative diagram illustrating one example of a hardware configuration capable of achieving example embodiments according to the present disclosure.

The above-described information communicating device may include a general-purpose hardware device 1200 exemplarily illustrated in FIG. 12 and various types of software programs (computer programs) executed by the hardware device 1200.

A processor 1201 in FIG. 12 is, for example, a general-purpose central processing unit (CPU) or a microprocessor. The processor 1201 may read out, to a memory 1202, for example, various types of software programs stored in a non-volatile storage device 1203 to be described later and execute processing in accordance with the software program. In this case, components of an information communicating device according to the example embodiments can be achieved, for example, as a software program executed by the processor 1201.

In this case, the back-end server 100 may be achieved, for example, by one or more programs mounted with functions of the server control unit 101, the gateway communication unit 102, the statistical information calculation unit 103, the reception data process unit 104, the statistical information storage 105, the reception data storage 106, and the neighboring gateway calculation unit 107. The gateway 200 may be achieved, for example, by one or more programs mounted with functions of the gateway control unit 201, the server communication unit 202, the sensor/gateway communication unit 203, the reception data process unit 204, the reception data storage 205, and the neighboring gateway storage 206. The gateway 1100 may be achieved by one or more programs mounted with functions of the control unit 1101 and the communication unit 1102. With regard to mounting of the program, various variations are assumable.

The memory 1202 is a memory device such as a RAM able to be referred to from the processor 1201 and stores a software program, various types of data and the like. Note that the memory 1202 may be a volatile memory device.

The non-volatile storage device 1203 is a non-volatile storage device such as a magnetic disk drive, a semiconductor storage device (flash memory and the like). The non-volatile storage device 1203 is able to store various types of software programs and data and the like. For example, data stored by the statistical information storage 105 and the reception data storage 106 in the back-end server 100 may be stored in the non-volatile storage device 1203. Similarly, data stored by the reception data storage 205 and the neighboring gateway storage 206 in the gateway 200 may be stored in the non-volatile storage device 1203.

The reader/writer 1204 is, for example, a device that executes read and write processing of data for a recording medium 1205 to be described later.

The recording medium 1205 is a recording medium such as an optical disc, a magneto-optical disc, a semiconductor flash memory, and the like capable of recording data. According to the present disclosure, a type of a recording medium and a recording method (format) are not specifically limited and may be appropriately selectable.

A network interface 1206 is an interface device for connection to a communication network and, for example, wired and wireless network interface cards (NICs) and the like are employable. For example, the gateway communication unit 102 in the back-end server 100 may be configured in such a way as to communicate with the gateway 200 via the network interface 1206. Further, for example, the server communication unit 202 in the gateway 200 may be configured in such a way as to communicate with the back-end server 100 via the network interface 1206. Further, the sensor/gateway communication unit 203 in the gateway 200 may be configured in such a way as to communicate with the sensor device 300 and another gateway 200 via the network interface 1206. Further, for example, the communication unit 1102 in the gateway 1100 may be configured in such a way as to communicate with a first information processing device, a second information processing device, and a device via the network interface 1206.

The technique according to the present disclosure may be achieved, for example, by executing, by using the processor 1201, a software program supplied to the hardware device 1200. In this case, an operating system running in the hardware device 1200 and middleware such as database management software, network software, and the like may partially execute processing.

Units illustrated in the figures according to the example embodiments described above may be achieved as software modules each being a unit of a function (processing) of a software program executed by the above-described hardware. When, for example, the units are achieved as software modules, these software modules may be stored in the non-volatile storage device 1203. The processor 1201 may read, when executing processing, these software modules onto the memory 1202. Further, these software modules may be configured in such a way as to be able to transmit various types of data to each other by an appropriate method such as a shared memory, and inter-process communication.

The software programs may be stored on the recording medium 1205. In this case, the software programs may be installed in the hardware device 1200 by using an appropriate tool. Further, various types of software programs may be downloaded from an outside via a communication line such as the Internet. As a method of supplying a software program, various types of general procedures are employable.

In such a case, the technique according to the present disclosure may be configured by using a code configuring a software program or a computer-readable recording medium recording a code. In this case, a recording medium may be a non-transitory recording medium independent of the hardware device 1200 or may be a recording medium storing or temporarily storing, via download, a software program that is transmitted via an LAN, the Internet, and the like.

The above-described information communicating device or a component of the information communicating device may be configured by using a virtual environment where the hardware device 1200 exemplarily illustrated in FIG. 12 is virtualized and a software program (computer program) executed in the virtual environment. In this case, a component of the hardware device 1200 exemplarily illustrated in FIG. 12 is provided as a virtual device in a virtual environment.

As described above, the technique according to the present disclosure has been described as an example applied to the above-described exemplary example embodiments. However, the scope of the technique according to the present disclosure is not limited to the range described according to the above-described example embodiments. It is clear to those of ordinary skill in the art that example embodiments as described above can be subjected to various modifications and improvements. In such a case, new example embodiments added with modifications or improvements are also included in the scope of the technique according to the present disclosure. Further, example embodiments combined with the above-described example embodiments or the new example embodiments added with modifications or improvements are also included in the scope of the technique according to the present disclosure. This is clear from items described in the appended claims.

This application is based upon and claims the benefit of priority from Japanese patent application No. 2017-176810, filed on Sep. 14, 2017, the disclosure of which is incorporated herein in its entirety by reference.

REFERENCE SIGNS LIST

100 Back-end server
101 Server control unit
102 Gateway communication unit
103 Statistical information calculation unit
104 Reception data process unit
105 Statistical information storage
106 Reception data storage
107 Neighboring gateway calculation unit
200 Gateway
201 Gateway control unit
202 Server communication unit (first communication unit)
203 Sensor/gateway communication unit (second communication unit)
204 Reception data process unit
205 Reception data storage
206 Neighboring gateway storage 300 Sensor device
301 Gateway communication unit
302 Data acquisition unit
1100 Gateway
1101 Control unit
1102 Communication unit

What is claimed is:

1. An information communicating device comprising:
a processor;
a memory having stored therein computer instructions causing the processor to act as:
a communication unit configured to receive data transmitted from a sensor device via a communication network; and
a control unit configured to generate transmission data including the data received by the communication unit and control the communication unit in such a way as to transmit the transmission data to a first information processing device,
wherein
when transmitting the transmission data to the first information processing device fails, the control unit
identifies, from one or more second information processing devices capable of transmitting the transmission data to the first information processing device, a particular second information processing device to which a process of transmitting the transmission data is assigned, based on
first information relating to disposition of each second information processing device, and
second information representing a priority level determined according to statistical information relating to communication in each second information processing device, and
controls the communication unit in such a way as to transfer the transmission data to the particular second information processing device, wherein
the particular second information processing device has a configuration corresponding to a configuration of the information communicating device,
the priority level is calculated for each second information processing device based on a number of communication failures per unit time as the statistical information relating to the communication in each second information processing device, and
the second information processing devices are prioritized in order from the second information processing device having a smallest number of communication failures per unit time to the second information processing device having a largest number of communication failures per unit time.

2. The information communicating device according to claim 1, wherein
the priority level is further calculated for each second information processing device based on a communication volume per unit time to the first information processing device and a communication frequency per unit time as the statistical information relating to the communication in each second information processing device,
the second information processing devices are further prioritized in order from the second information processing device having a smallest communication load to the second information processing device having a largest communication load.

3. The information communicating device according to claim 2, wherein
the control unit identifies as the particular second information processing device the second information processing device existing in a vicinity of the information communicating device, based on the first information.

4. The information communicating device according to claim 1, wherein
the control unit identifies as the particular second information processing device the second information processing device existing in a vicinity of the information communicating device, based on the first information.

5. The information communicating device according to claim 4, wherein
the control unit identifies as the particular second information processing device the second information device communicable with the sensor device.

6. The information communicating device according to claim 5, wherein,
when the communication unit receives other transmission data from a different particular second information processing device having a configuration corresponding to the configuration of the information communicating device,
the control unit transfers, when the different particular second information processing device exists in the vicinity of the information communicating device, the other transmission data to the first information processing device, and
does not transfer, when the different particular second information processing device does not exist in the vicinity of the information communicating device, the other transmission data to the first information processing device.

7. The information communicating device according to claim 4, wherein,
when the communication unit receives other transmission data from a different particular second information processing device having a configuration corresponding to the configuration of the information communicating device,
the control unit transfers, when the different particular second information processing device exists in the vicinity of the information communicating device, the other transmission data to the first information processing device, and
does not transfer, when the different particular second information processing device does not exist in the vicinity of the information communicating device, the other transmission data to the first information processing device.

8. An information communicating system comprising:
a back-end server being the first information processing device of claim 2; and
a plurality of the information communicating devices that are each according to claim 2, wherein
the back-end server
acquires a list of sensor devices with which each information communicating device is communicable, and sets, based on the list, two or more of the information communicating devices communicable with a same sensor device as existing in a vicinity, and
reports another of the information communicating devices existing in the vicinity to each of the two or more of the information communicating devices communicable with the same sensor device.

9. The information communicating system according to claim 8, wherein
- a first particular information communicating device records, when receiving the transmission data from a second particular information communicating device, information representing that a process of transmitting the transmission data is assigned, on the transmission data, and transmits the transmission data on which the information representing the process of transmitting the transmission device is assigned has been recorded, to the back-end server, and
- the back-end server
  - calculates, when receiving the transmission data from each information communicating device, the communication volume per unit time and the communication frequency per unit time as the statistical information for each information communicating device,
  - determines, when the transmission data include the information representing that the process of transmitting the transmission data is assigned, that a communication failure has occurred and calculates the number of communication failures per unit time for the information communicating device that assigns the process of transmitting the transmission data,
  - calculates the priority level with respect to each information communicating device according to the communication volume per unit time, the communication frequency per unit time, and the number of communication failures per unit time, and
  - reports the calculated priority level to each information communicating device.

10. An information communicating system comprising:
- a back-end server being the first information processing device of claim 2; and
- a plurality of the information communicating devices that are each according to claim 2, wherein
- the data received by each information communicating device from the sensor device specifies identifying information identifying the sensor device,
- each information communicating device generates the transmission data including the data received from the sensor device, the identifying information, and additional identifying information identifying the each information communicating device and transmits the transmission data to the back-end server, and
- the back-end server
  - identifies, based on the identifying information and the additional identifying information, the information communicating devices communicable with a same sensor device, and sets the information communicating devices communicable with the same sensor device as existing in a vicinity, and
  - reports another of the information communicating devices existing in the vicinity to each of the information communicating devices communicable with the same sensor device.

11. The information communicating system according to claim 10, wherein
- a first particular information communicating device records, when receiving the transmission data from a second particular information communicating device, information representing that a process of transmitting the transmission data is assigned, on the transmission data, and transmits the transmission data on which the information representing the process of transmitting the transmission device is assigned has been recorded, to the back-end server, and
- the back-end server
  - calculates, when receiving the transmission data from each information communicating device, the communication volume per unit time and the communication frequency per unit time as the statistical information for each information communicating device,
  - determines, when the transmission data include the information representing that the process of transmitting the transmission data is assigned, that a communication failure has occurred and calculates the number of communication failures per unit time for the information communicating device that assigns the process of transmitting the transmission data,
  - calculates the priority level with respect to each information communicating device according to the communication volume per unit time, the communication frequency per unit time, and the number of communication failures per unit time, and
  - reports the calculated priority level to each information communicating device.

12. An information communicating method comprising by an information communicating device:
- receiving data transmitted from a sensor device via a communication network; and
- generating transmission data including the data, and controlling transmission of the transmission data to a first information processing device, wherein
- in the controlling, when the transmission of the transmission data to the first information processing device fails, identifying, from one or more second information processing devices capable of transmitting the transmission data to the first information processing device, a particular second information processing device to which a process of transmitting the transmission data is assigned, based on
  - first information relating to disposition of each second information processing device, and
  - second information representing a priority level determined according to statistical information relating to communication in each second information processing device, and
- transferring the transmission data to the particular second information processing device, wherein
- the particular second information processing device has a configuration corresponding to a configuration of the information communicating device,
- the priority level is calculated for each second information processing device based on a number of communication failures per unit time as the statistical information relating to the communication in each second information processing device, and
- the second information processing devices are prioritized in order from the second information processing device having a smallest number of communication failures per unit time to the second information processing device having a largest number of communication failures per unit time.

13. An information communicating system comprising:
- a back-end server being the first information processing device of claim 4; and a plurality of the information communicating devices that are each according to claim 4, wherein the back-end server acquires a list of sensor devices with which each information communicating device is communicable, and sets, based on the list, two or more of the information communicating devices communicable with a same sensor device as existing in a vicinity, and reports another of the information communicating devices existing in the vicinity to each of the two or more of the information communicating devices communicable with the same sensor device.

14. An information communicating system comprising:

a back-end server being the first information processing device of claim 5; and a plurality of the information communicating devices that are each according to claim 5, wherein the back-end server acquires a list of sensor devices with which each information communicating device is communicable, and sets, based on the list, two or more of the information communicating devices communicable with a same sensor device as existing in a vicinity, and reports another of the information communicating devices existing in the vicinity to each of the two or more of the information communicating devices communicable with the same sensor device.

15. An information communicating system comprising:

a back-end server being the first information processing device of claim 3; and a plurality of the information communicating devices according to claim 3, wherein the data received by each information communicating device from the sensor device specifies identifying information identifying the sensor device, each information communicating device generates the transmission data including the data received from the sensor device, the identifying information, and additional identifying information identifying the each information communicating device and transmits the transmission data to the back-end server, and the back-end server identifies, based on the identifying information and the additional identifying information, the information communicating devices communicable with a same sensor device, and sets the information communicating devices communicable with the same sensor device as existing in a vicinity, and reports another of the information communicating devices existing in the vicinity to each of the information communicating devices communicable with the same sensor device.

16. An information communicating system comprising:

a back-end server being the first information processing device of claim 4; and a plurality of the information communicating devices that are each according to claim 4, wherein the data received by each information communicating device from the sensor device specifies identifying information identifying the sensor device, each information communicating device generates the transmission data including the data received from the sensor device, the identifying information, and additional identifying information identifying the each information communicating device and transmits the transmission data to the back-end server, and the back-end server identifies, based on the identifying information and the additional identifying information, the information communicating devices communicable with a same sensor device, and sets the information communicating devices communicable with the same sensor device as existing in a vicinity, and reports another of the information communicating devices existing in the vicinity to each of the information communicating devices communicable with the same sensor device.

\* \* \* \* \*